(12) United States Patent
Ho et al.

(10) Patent No.: US 11,530,502 B2
(45) Date of Patent: Dec. 20, 2022

(54) ARTICLE WITH INTEGRAL LOOPS AND METHOD OF MANUFACTURING

(71) Applicant: NIKE, Inc., Beaverton, OR (US)

(72) Inventors: Fanny Yung Ho, Portland, OR (US); Guillermo Raffaele, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 119 days.

(21) Appl. No.: 16/991,663

(22) Filed: Aug. 12, 2020

(65) Prior Publication Data

US 2021/0102323 A1    Apr. 8, 2021

Related U.S. Application Data

(60) Provisional application No. 62/909,451, filed on Oct. 2, 2019.

(51) Int. Cl.

| | |
|---|---|
| *D05C 17/00* | (2006.01) |
| *D05C 3/02* | (2006.01) |
| *A43B 5/02* | (2006.01) |
| *A43B 23/02* | (2006.01) |
| *A43C 11/14* | (2006.01) |
| *A44B 18/00* | (2006.01) |
| *A41D 27/20* | (2006.01) |

(52) U.S. Cl.
CPC .............. *D05C 17/00* (2013.01); *A43B 5/025* (2013.01); *A43B 23/025* (2013.01); *A43C 11/1493* (2013.01); *A44B 18/0011* (2013.01); *A41D 27/201* (2013.01); *A41D 2300/32* (2013.01); *A44D 2205/00* (2013.01); *D05C 3/02* (2013.01); *D10B 2401/024* (2013.01); *D10B 2403/01* (2013.01); *D10B 2501/043* (2013.01)

(58) Field of Classification Search
CPC ....................... A44B 18/0034; D10B 2403/01; D05C 15/00; D05C 15/04; D04H 11/00; D03D 27/00
USPC .......................................................... 428/85
See application file for complete search history.

(56) References Cited

U.S. PATENT DOCUMENTS

| | | |
|---|---|---|
| 3,550,223 A | 12/1970 | Erb |
| 3,859,441 A | 1/1975 | Moon |

(Continued)

FOREIGN PATENT DOCUMENTS

| | | |
|---|---|---|
| CN | 204738125 U | 11/2015 |
| CN | 105877002 A | 8/2016 |

(Continued)

*Primary Examiner* — Alissa L Hoey
*Assistant Examiner* — Patrick J. Lynch
(74) *Attorney, Agent, or Firm* — Quinn IP Law

(57) ABSTRACT

A method of manufacturing an article may include loading a soluble bobbin thread into an embroidery machine and then driving a needle thread through a base sheet with a needle of the embroidery machine according to a programmed first pattern that provides a series of loops of the needle thread extending outward from a bobbin side of the base sheet. The method may further include bonding the needle thread to a needle side of the base sheet opposite from the bobbin side. A spacer layer may be disposed at the bobbin side of the base sheet, and may be removed after the needle thread is bonded to the base sheet. The loops may be loops of a hook-and-loop fastener or ball control features in various articles manufactured according to the method.

15 Claims, 11 Drawing Sheets

(56) References Cited

U.S. PATENT DOCUMENTS

| | | | |
|---|---|---|---|
| 3,859,941 A * | 1/1975 | Krieger | D04C 1/04 |
| | | | 28/164 |
| 6,263,817 B1 * | 7/2001 | Tajima | D05C 17/00 |
| | | | 112/439 |
| 6,565,943 B1 | 5/2003 | Kondo et al. | |
| 7,930,982 B2 | 4/2011 | Surget | |
| 8,056,173 B2 | 11/2011 | RongBo | |
| 8,702,427 B1 | 4/2014 | Prestwood | |
| 9,321,218 B2 | 4/2016 | Han | |
| 2002/0182368 A1 * | 12/2002 | Dimitri | D06N 7/0068 |
| | | | 428/95 |
| 2005/0087113 A1 * | 4/2005 | Goda | D05C 7/00 |
| | | | 156/155 |
| 2006/0231196 A1 | 10/2006 | Zorzi et al. | |
| 2007/0204783 A1 * | 9/2007 | Chong | D05C 17/00 |
| | | | 112/475.22 |
| 2010/0089297 A1 * | 4/2010 | Butcher | D05C 7/00 |
| | | | 112/440 |
| 2012/0260838 A1 * | 10/2012 | Matsuhiro | D05C 7/08 |
| | | | 112/113 |
| 2012/0272463 A1 | 11/2012 | Crisp et al. | |
| 2014/0048003 A1 | 2/2014 | Farris | |
| 2017/0098491 A1 * | 4/2017 | Ziaie | A41D 1/005 |
| 2018/0125158 A1 | 5/2018 | Adami et al. | |
| 2019/0079582 A1 * | 3/2019 | Lyons | G06F 3/017 |

FOREIGN PATENT DOCUMENTS

| | | | |
|---|---|---|---|
| GB | 447977 A | | 5/1936 |
| JP | H1121758 A | | 1/1996 |
| JP | 2002061066 A | * | 2/2002 |
| KR | 100786646 B1 | | 12/2007 |
| KR | 100894549 B1 | | 4/2009 |
| WO | 2008039497 A2 | | 4/2008 |
| WO | 2013155081 A1 | | 10/2013 |

* cited by examiner

ARTICLE WITH INTEGRAL LOOPS AND METHOD OF MANUFACTURING

CROSS-REFERENCE TO RELATED APPLICATIONS

This application claims the benefit of priority to U.S. Provisional Application No. 62/909,451 filed Oct. 2, 2019, which is hereby incorporated by reference in its entirety.

TECHNICAL FIELD

The present disclosure generally relates to an article having a base sheet with loops extending from the base sheet and a method of manufacturing such an article using an embroidery machine.

BACKGROUND

Many articles, such as footwear uppers and apparel, include multiple layers of the same or different materials. Each layer may serve a different function in some examples. Manufacturers strive to provide high quality, durable articles in an efficient manner.

BRIEF DESCRIPTION OF THE DRAWINGS

The drawings described herein are for illustrative purposes only, are schematic in nature, and are intended to be exemplary rather than to limit the scope of the disclosure.

DESCRIPTION

Figure 1A:
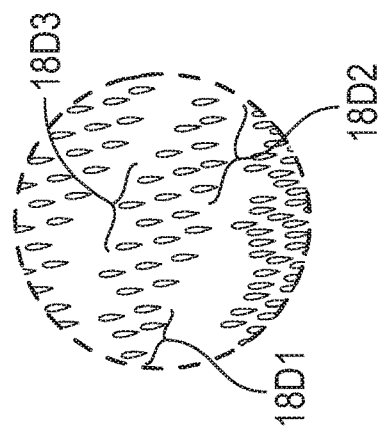
FIG. 1A is a closeup view of a portion of the base sheet and series of loops of FIG. 1.

A method of manufacturing articles and articles manufactured according to the method as disclosed herein utilize an embroidery machine in a new way to produce a series of loops extending from a base sheet without a separate base layer (e.g., a separate backing) for the loops. Stated differently, the base sheet, which is a functional portion of the article, such as a side panel or strap of a footwear upper, a panel or pocket of an article of apparel, or a panel of a carry bag, also serves as the base or backing for the loops. For example, wearable articles may have loops that are functional, such as for a hook-and-loop fastener or for increasing friction (e.g., for ball control on a footwear upper). The method and articles integrate the loops with the base sheet, eliminating the need for a separate base for the loops with the separate base layered on the base sheet, as is typically done. The overall bulk and thickness of the article is less than if a separate base was used.

A method of manufacturing an article may include loading a soluble bobbin thread into an embroidery machine and then driving a needle thread through a base sheet with a needle of the embroidery machine according to a programmed first pattern that provides a series of loops of the needle thread extending outward from a bobbin side of the base sheet. The soluble bobbin thread engages the series of loops outward of the bobbin side of the base sheet. The method may further include bonding the needle thread to a needle side of the base sheet opposite from the bobbin side of the base sheet and then applying a solvent to the soluble bobbin thread to dissolve the soluble bobbin thread. For example, the soluble bobbin thread may be water soluble and the solvent may be water in some adaptations of the method. The series of loops may be configured as a loop portion of a hook-and-loop fastener but an additional fastener base sheet is not required as the base sheet of the article itself (e.g., a side panel of the footwear upper, or a strap of the footwear upper) is integrated with and serves as a base through which the loops extend. In other embodiments, the series of loops extends outward from a base sheet that is a footwear upper and at least some of the loops are configured as ball control elements, such as on an article of footwear. In any implementation, the function of the loops is enabled without the added bulk and cost of a separate base layer for the loops.

In an implementation, the method may further include, prior to driving the needle thread through the base sheet, disposing an inner side of one or more spacer layers at the bobbin side of the base sheet so that an inner side of the one or more spacer layers is at the bobbin side of the base sheet. The needle thread may then be driven through both the base sheet and the one or more spacer layers so that the series of loops initially extends through the base sheet from the inner side of the base sheet to an outer side of the base sheet and into the one or more spacer layers and the soluble bobbin thread is outward of an outer side of the one or more spacer layers. After applying a solvent to the soluble bobbin thread, the spacer layer may then be moved away from the base sheet to slide the one or more spacer layers off of the series of loops.

The one or more spacer layers serve to ensure a consistent desired height of the loops and protect the base sheet from the solvent applied to the soluble bobbin thread. Additionally, the number or total height of the one or more spacer layers used may be varied to control the final height of the loops. The height of the loops may be one factor affecting the fastening strength of the hook-and-loop fastener when the loops are the loop portion of a hook-and-loop fastener. For example, longer loops may provide greater fastening strength than shorter loops, all other factors (such as density of the loops) being equal. Accordingly, simply by stacking a different number of spacer layers having a different total height or using a different single spacer layer having a different height, a different loop height may be achieved. For example, after using a first base sheet and one or more first spacer layers that are a first number of spacer layers and have a first total height to manufacture a first article with a first series of loops extending from the first base sheet as described, the method may further comprise manufacturing a second article by disposing one or more second spacer layers that are a second number of spacer layers and have a second total height at a bobbin side of a second base sheet so that an inner side of the one or more second spacer layers is at the bobbin side of the second base sheet. The second number of spacer layers may be the same as or different than the first number of spacer layers, and the second total height may be different than the first total height, or both. The method may include driving a needle thread through both the second base sheet and the one or more second spacer layers with the needle of the embroidery machine according to the programmed first pattern or a different programmed pattern to provide a second series of loops of the needle thread that extend outward from the bobbin side of the second base sheet through the one or more second spacer layers and engage with a bobbin thread disposed at an outer side of the one or more second spacer layers. The method may include bonding the needle thread to a needle side of the second base sheet opposite from the bobbin side of the second base sheet, removing the bobbin thread, and moving the one or more second spacer layers away from the base sheet to slide the one or more spacer layers off of the second series of loops. The second series of loops have a different height than the first series of loops as may be appropriate for the fastening strength needed for the second article.

In an aspect, in order to anchor the needle thread at the side of the base sheet opposite from the series of loops, a fusible thread may be used for the needle thread. The method may include bonding the needle thread to the needle side of the base sheet by applying heat to the fusible needle thread at the needle side of the base sheet. As another alternative way to anchor the needle thread at the side of the base sheet opposite from the series of loops, the method may include disposing a meltable bonding layer against the needle side of the base sheet prior to driving the needle thread through the base sheet. When a meltable bonding layer is used, driving the needle thread through the base sheet may thus further include driving the needle thread through the meltable bonding layer, and bonding the needle thread to the needle side of the base sheet may include applying heat to the meltable bonding layer. In some configurations, the meltable bonding layer may comprise thermoplastic polyurethane. In still other implementations, a layer of adhesive may be used to anchor the series of loops to the needle side of the base sheet, and the method may include applying adhesive to the needle side of the base sheet. Stated differently, the base sheet of the article itself supports the loops. Because the needle thread is bonded to the needle side of the base sheet, the loops will not be pushed back through the base sheet toward the needle side, nor pulled through the base sheet toward the bobbin side under the stresses of use.

Using an embroidery machine to provide a series of loops in this manner enables a wide variety of patterns, loop heights and/or densities, thread color combinations, etc. to be provided with the speed of a multi-needle embroidery machine, for example. In some implementations, a first group of the loops has a first density and a second group of the loops has a second density different from the first density. In the same or other embodiments, a first set of the loops has a first color and a second set of the loops has a second color different from the first color. Additionally, a third set of the loops may be disposed between the first set and the second set and may have a color gradient that changes from the first color to the second color.

The use of an embroidery machine also enables a change in loop patterns, heights, densities, thread colors or patterns of colors, etc. to be accomplished quickly by simply controlling the machine to drive the needle according to a different stored program. For example, the article with the series of loops described above may be a first article, the base sheet may be a first base sheet, and the needle thread may be a first needle thread. The method may further comprise driving a second needle thread through a second base sheet with the needle of the embroidery machine in a second pattern that is different than the first pattern in at least one of color, density of loops, or height of loops.

In an aspect, a method of manufacturing an article may include disposing one or more spacer layers at a bobbin side of a base sheet so that an inner side of the one or more spacer layers is at the bobbin side of a base sheet, and then driving a needle thread through both the base sheet and the one or more spacer layers with a needle of an embroidery machine according to a programmed first pattern that provides a series of loops of the needle thread extending outward from the bobbin side of the base sheet through the one or more spacer layers and engaging with a bobbin thread disposed at an outer side of the one or more spacer layers. The method may include bonding the needle thread to a needle side of the base sheet opposite from the bobbin side of the base sheet, removing the bobbin thread, and moving the one or more spacer layers away from the base sheet to slide the one or more spacer layers off of the series of loops. For example, the bobbin thread may be a soluble bobbin thread, and removing the bobbin thread may be by applying a solvent to the soluble bobbin thread to dissolve the soluble bobbin thread.

An article such as a footwear upper, an article of apparel, or a carry bag, may include a base sheet and a thread configured as a series of loops. The series of loops may be configured as a loop portion of a hook-and-loop fastener. The series of loops may be arranged in a first pattern and may extend through the base sheet and outward from a first side of the base sheet. The thread may be bonded to a second side of the base sheet opposite from the first side of the base sheet. The thread may be a fusible thread and may be directly fused to the second side of the base sheet. In another aspect, a meltable bonding layer may be disposed against the second side of the base sheet and the thread may extend through the meltable bonding layer. The thread may be bonded to the second side of the base sheet by the meltable bonding layer. In still another aspect, adhesive may secure the thread to the second side of the base sheet. In an example, the series of loops may be configured as a loop portion of a hook-and-loop fastener on, for example, a footwear upper, an article of apparel, or a carry bag. In an example, the article may be a footwear upper and the series of loops may extend at an exterior of the footwear upper. The series of loops may be configured as a ball control feature or as a strap fastener.

The above features and advantages and other features and advantages of the present teachings are readily apparent from the following detailed description of the modes for carrying out the present teachings when taken in connection with the accompanying drawings.

Figure 1:
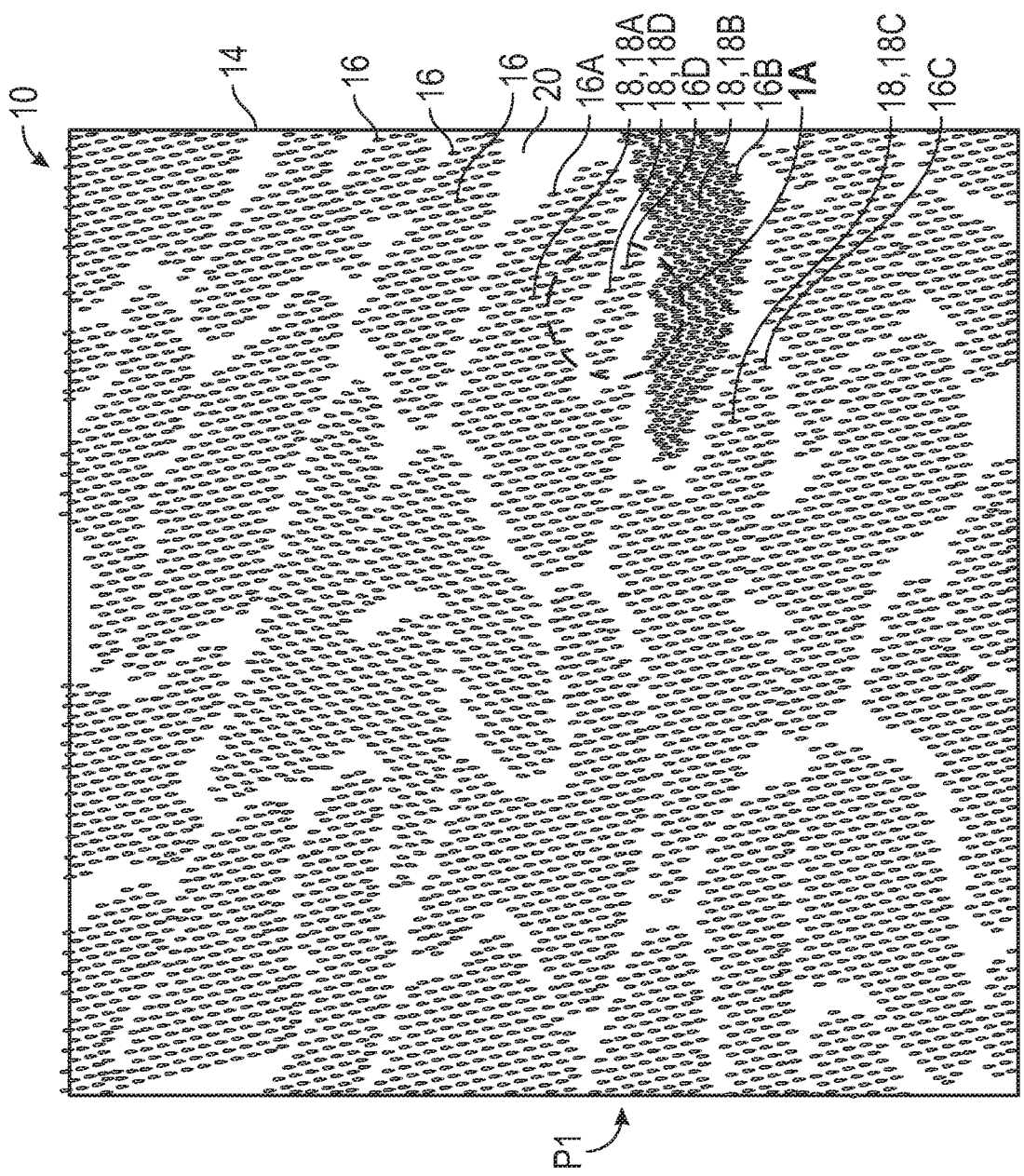
FIG. 1 is a plan view of an article including a base sheet and a thread extending through the base sheet as a series of loops.
Figure 3:
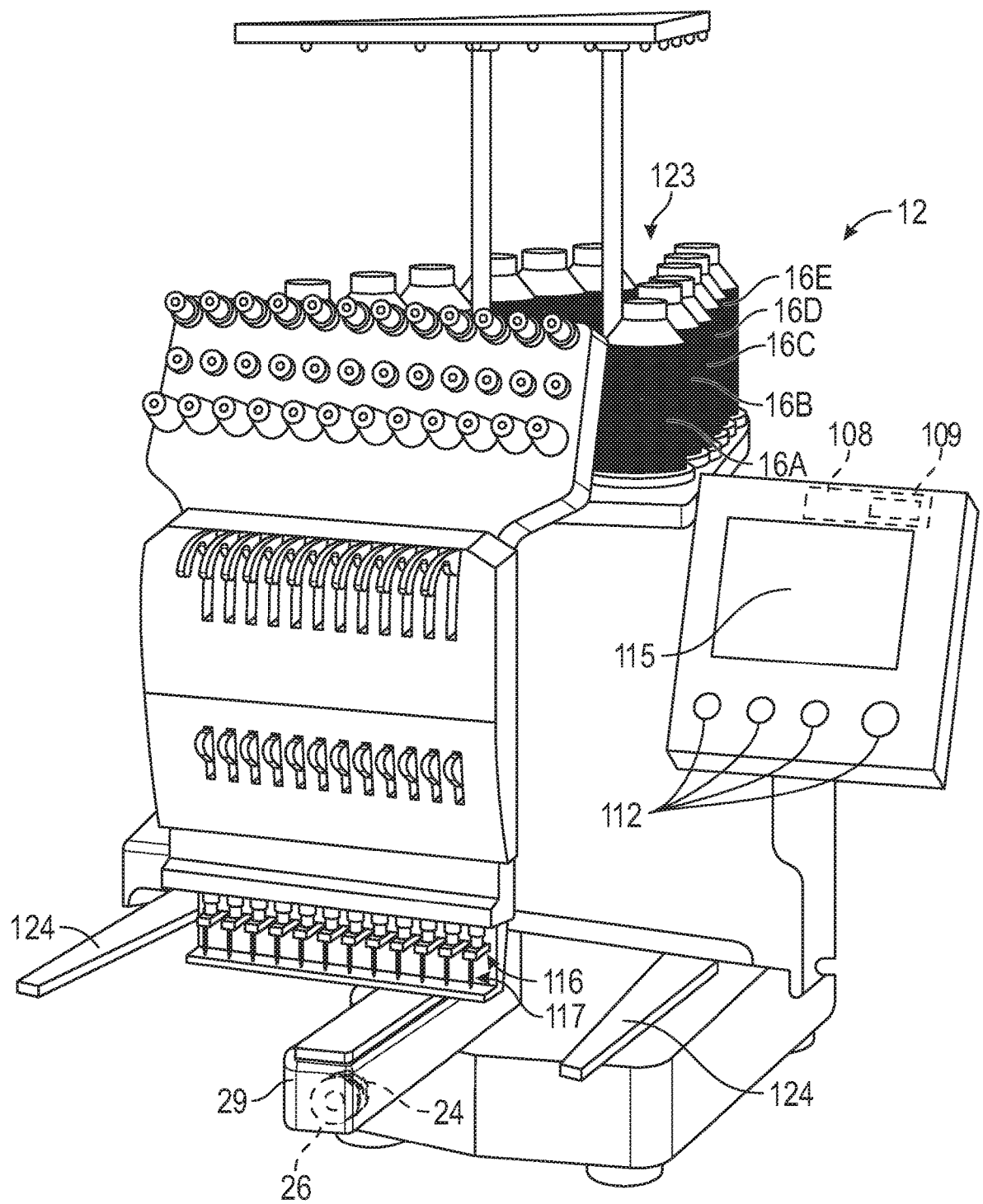
FIG. 3 is a perspective view of an example embroidery machine that may be used in manufacturing the article of FIG. 1.

FIG. 1 shows an article 10 manufactured by the use of an embroidery machine such as the example embroidery machine 12 shown in FIG. 3. The article 10 includes a base sheet 14 that may be, for example, a woven or nonwoven textile or a non-textile material. The article 10 includes one or more threads 16 each configured as a series of loops 18. The base sheet 14 supports the series of loops 18, and the series of loops 18 extend through the base sheet 14 with no additional intermediate layer between the base sheet 14 and the series of loops 18. The series of loops 18 may be functional rather than solely decorative. For example the series of loops 18 may be configured to be used as the loop portion of a hook-and-loop fastener integrated with the base sheet 14 in some embodiments such as discussed with respect to FIGS. 14-16. References to a series of loops 18 herein include the loops 18A, 18B, 18C, 18D, 18E, 18F, 18G, 18H and 18J. Stated differently, the base sheet 14, 114, 314, or 414 serves as the base for the loops 18 and the article 10, 110, 110A, 310, or 410 is characterized by an absence of an additional fastener base sheet from which the loops 18 extend. In other words, in articles manufactured according to the method 200 described herein, the base sheet of the article itself supports the loops. In an example where the article is a footwear upper, the base sheet may be the body of the upper (e.g., a side panel of the upper that forms part of a foot-receiving cavity and surrounds a foot) rather than a component added to the article solely to serve as the base of the loops. Traditionally, hook-and-loop fasteners include a dedicated base sheet from which the loops extend and that is secured to the base sheet of the article (e.g., the dedicated base sheet is an additional layer adds bulk and weight to the article). Accordingly, the article 10 is lighter and more flexible than if a fastener base sheet were secured to base sheet 14 with the loops 18 extending from the fastener base sheet. Alternatively or in addition, the series of loops may be configured as ball control features integrated with a footwear upper, such as discussed with respect to FIG. 13.

As shown in FIG. 1, there are multiple different sets of loops, also referred to as groups of loops, within the series of loops 18. Only some of the sets or groups are indicated with reference numbers in FIG. 1, such as set of loops 18A, set of loops 18B, set of loops 18C, and set of loops 18D. Each set of loops 18A, 18B, 18C, and 18D is constructed from a different thread 16A, 16B, 16C, and 16D or segment of the same thread. If from different threads, each of the threads 16A, 16B, 16C, and 16D may be a different color. The series of loops 18 are arranged in a first pattern shown in FIG. 1, and extend through the base sheet 14 and outward from a first side 20 of the base sheet 14. The first side 20 is also referred to herein as the bobbin side as it is facing the bobbin 26 rather than the needle drives 116 of the embroidery machine 12 during processing.

Using an embroidery machine such as the multi-needle embroidery machine 12 of FIG. 3 to provide a series of loops 18 in this manner enables a wide variety of patterns, loop densities, and thread color combinations, etc. For example, the first group of the loops 18A may have a first density such as 10 loops per inch, and the second group of the loops 18B may have a second density different from the first density, such as 20 loops per inch. Additionally, the thread 16A used to construct the first set of the loops 18A may have a first color, such as red, and the thread 16B used to construct the second set of the loops 18B may have a second color different from the first color, such as blue. The set of loops 18C may be referred to as a third set of loops, and the thread 16C used to construct the third set 18C may have a third color different than both the first color and the second color, such as green. Additionally, a set of loops 18D may also be referred to as a third set of the loops and may be disposed between the first set 18A and the second set 18B. Two different threads may be used to construct the set of loops 18D so that the loops 18D have a color gradient that changes from the first color to the second color. For example, as shown in FIG. 1A, loops 18D1 at the left end of the series 18D and near the first set 18A may be constructed of a red thread 16A, loops 18D2 at the right end of the series 18D near the second set 18B may be blue, and loops 18D3 between the loops 18D1 and 18D2 may be a mix of red and blue, with more red loops near the loops 18D1, and more blue loops near the loops 18D2. In other examples, one or more color gradients may be established by the use of different color threads 16 in portions of or across the entire pattern P1.

Figure 2:
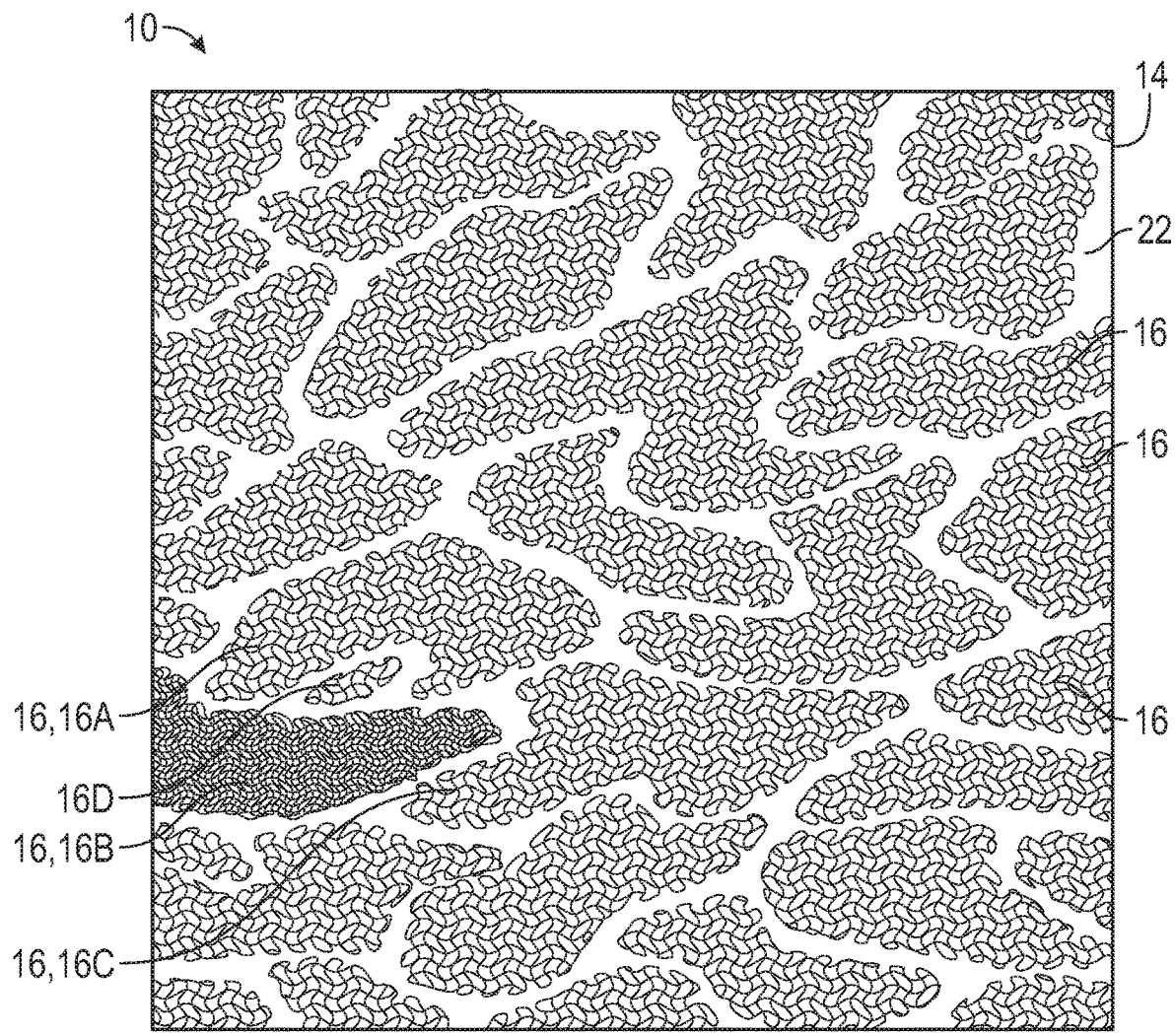
FIG. 2 shows an opposite side of the article of FIG. 1.

As shown in FIG. 2, the one or more threads 16 (e.g., threads 16A, 16B, 16C, and 16D) are bonded to a second side 22 of the base sheet 14 that is opposite from the first side 20 of the base sheet 14. The second side 22 is also referred to as the needle side of the base sheet 14 as it is disposed facing or at least nearer to the needle drive 116 rather than the bobbin 26 of the embroidery machine 12 during the embroidering process. The threads 16 are bonded to the second side 22 by any of multiple different ways described herein. In the embodiment depicted in FIGS. 1-2, the threads 16 are fusible threads such as meltable thermoplastic polyurethane (TPU) threads and are melted at the second side 22 only to bond to the second side 22. In some embodiments, the thread 16 may be nylon. In some examples, the thread 16 may have a thickness from about 0.05 mm to about 0.1 mm. For example, a thread 16 with a thickness of about 0.08 mm may be used, such as when the thread 16 forms loops 18 used as a loop portion of a hook-and-loop fastener.

FIG. 3 shows the representative embroidery machine 12 that has a controller 108 with a stored program 109 to control operation of one or more needle drives 116 each supporting a needle 117. The controller 108 may receive input instructions via electronic or wireless signals generated by an operator accessing input devices such as buttons 112 and/or a display screen 115 to control operation of the one or more needle drives 116. Multiple needle drives 116 may be controlled simultaneously to more quickly impart the series of loops 18 extending through the base sheet 14. Alternatively, each loop of the series of loops 18 can be imparted by a single one of the needle drives 116.

A hoop or hooping system may be coupled to the base sheet 14 and rest on a transversely movable frame 124 of the embroidery machine 12 to move the base sheet 14 transversely relative to the driven and repetitively longitudinally (e.g., up and down) oscillating needles 117, as understood by those skilled in the art of embroidery. The embroidery machine 12 is operable to embroider via the needle drives 116 using one or more threads 16A, 16B, 16C, 16D, etc., stored on spools 123 and each routed to a different one of the needles 117.

Figure 4:
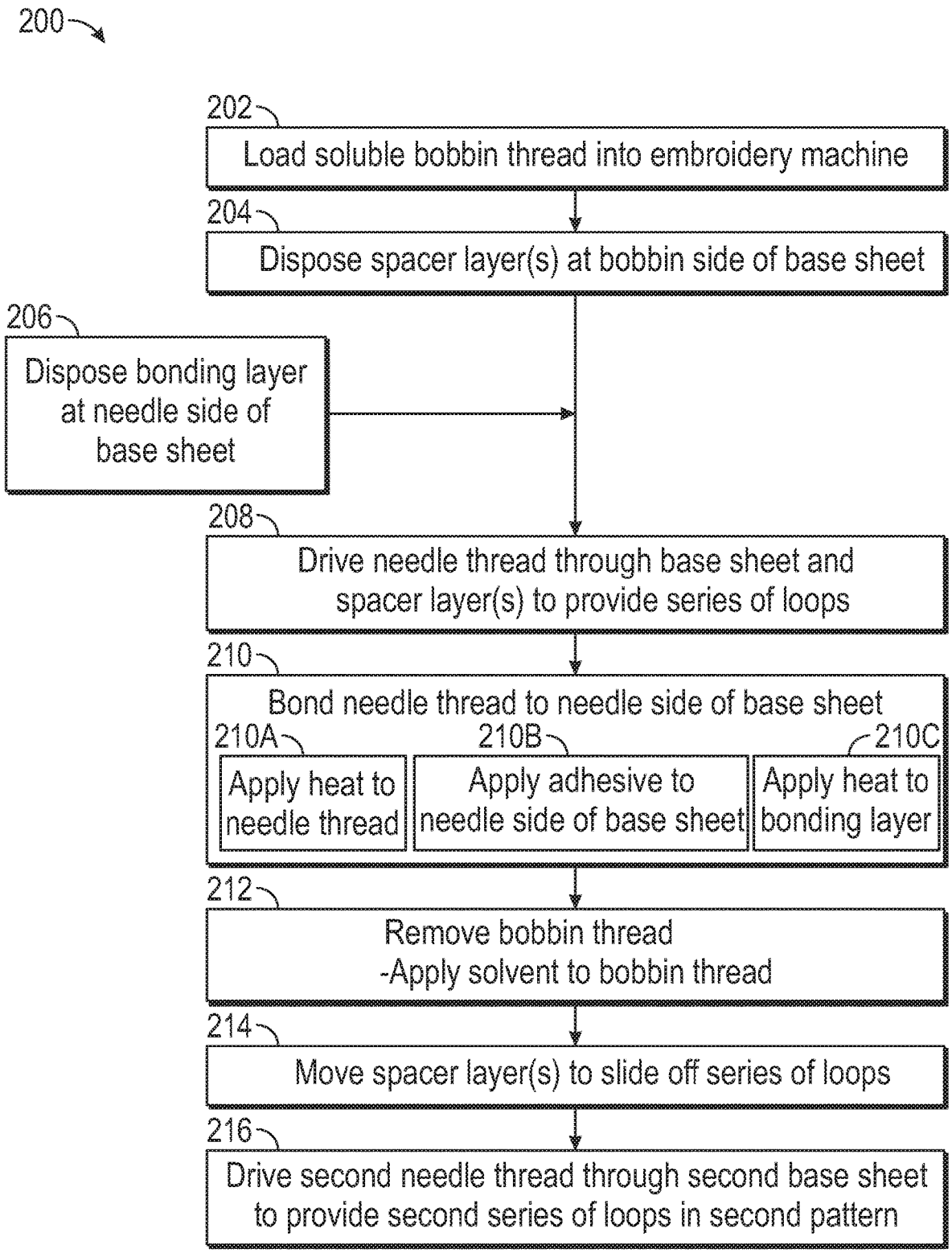
FIG. 4 is a flow diagram of an example method of manufacturing the article of FIG. 1.
Figure 5:
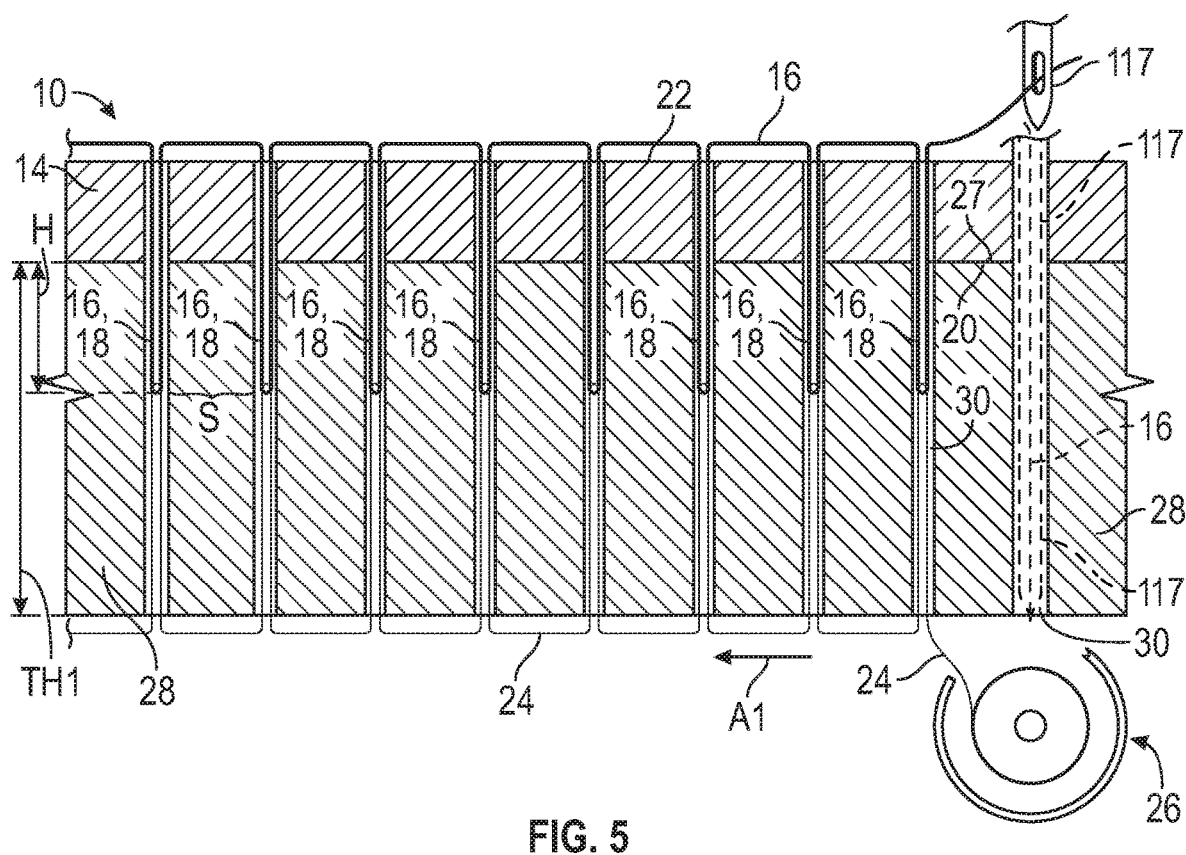
FIG. 5 is a fragmentary cross-sectional view of the article of FIG. 1 at an intermediate stage of manufacture, illustrating manufacturing of the article according to the method disclosed herein by driving a needle thread through the base sheet and a spacer layer and engaging a bobbin thread.

FIG. 4 is a flow diagram of an example method 200 of manufacturing the articles 10, 10A, 10B, 110, 110A, 310, and 410 using the embroidery machine 12 of FIG. 3. The method 200 may include step 202, loading a removable bobbin thread 24 on a bobbin 26 of the embroidery machine 12 as illustrated in FIG. 5. In FIG. 3, the bobbin 26 and bobbin thread 24 are housed within a casing 29 below the needle drives 116. The bobbin thread 24 will be disposed mainly outward of the first side 20 of the base sheet 14 during the embroidery process (e.g., outward of and within the spacer layer(s) 28 which are disposed at the first side 20), and will engage with the thread 16 used to form the loops 18. After embroidering the article 10, the bobbin thread 24 may be removed from the article 10 without affecting the loops 18. In the embodiment shown, the bobbin thread 24 is soluble bobbin thread 24, and more specifically water soluble bobbin thread, and is removable by dissolving in water.

The method 200 may also include step 204, disposing an inner side 27 of one or more spacer layers 28 at the bobbin side 20 (e.g., the first side 20) of the base sheet 14. Only a single spacer layer 28 is used in making the article 10 with loops 18 as shown in FIGS. 5-11. The loops 18 have a height H. The spacer layer 28 serves to ensure a consistent desired height H of the loops 18 by channeling the loops 18 within cylindrical bores 30 created by the needle(s) 117 driven through the base sheet 14 and the spaced layer 28. The height H of the loops 18 is measured from the first side 20 of the base sheet 14 to the top of each loop 18. In an example, the height H may be from about 1 millimeters (mm) to about 6 mm. For example, when the loops 18 are configured as a loop portion of a hook-and-loop fastener, the height H may be from about 2 mm to about 5 mm. When the loops 18 are configured as ball control features on a footwear upper, such as loops 18E in FIG. 13, the height H may be about 1.25 mm. Although there may be some variation due to dimensional tolerances of the embroidery machine 12, the base sheet 14, and/or the spacer layer 28, the loops 18 may be configured to each be of the same height H. Alternatively, the embroidery machine 12 may be programmed to configure different ones of the loops 18 to have different heights such as to impart a desired 3D effect of the loops 18. The bores 30 allow the loops 18 to be of a height H greater than a spacing S between adjacent ones of the loops 18 without risk that adjacent loops 18 will be entangled during the embroidery process. The spacer layer 28 also protects the base sheet 14 from the solvent applied to the soluble bobbin thread 24 in embodiments where the bobbin thread is soluble and is removed with solvent. In some embodiments, one spacer layer 28 is used.

Figure 17:
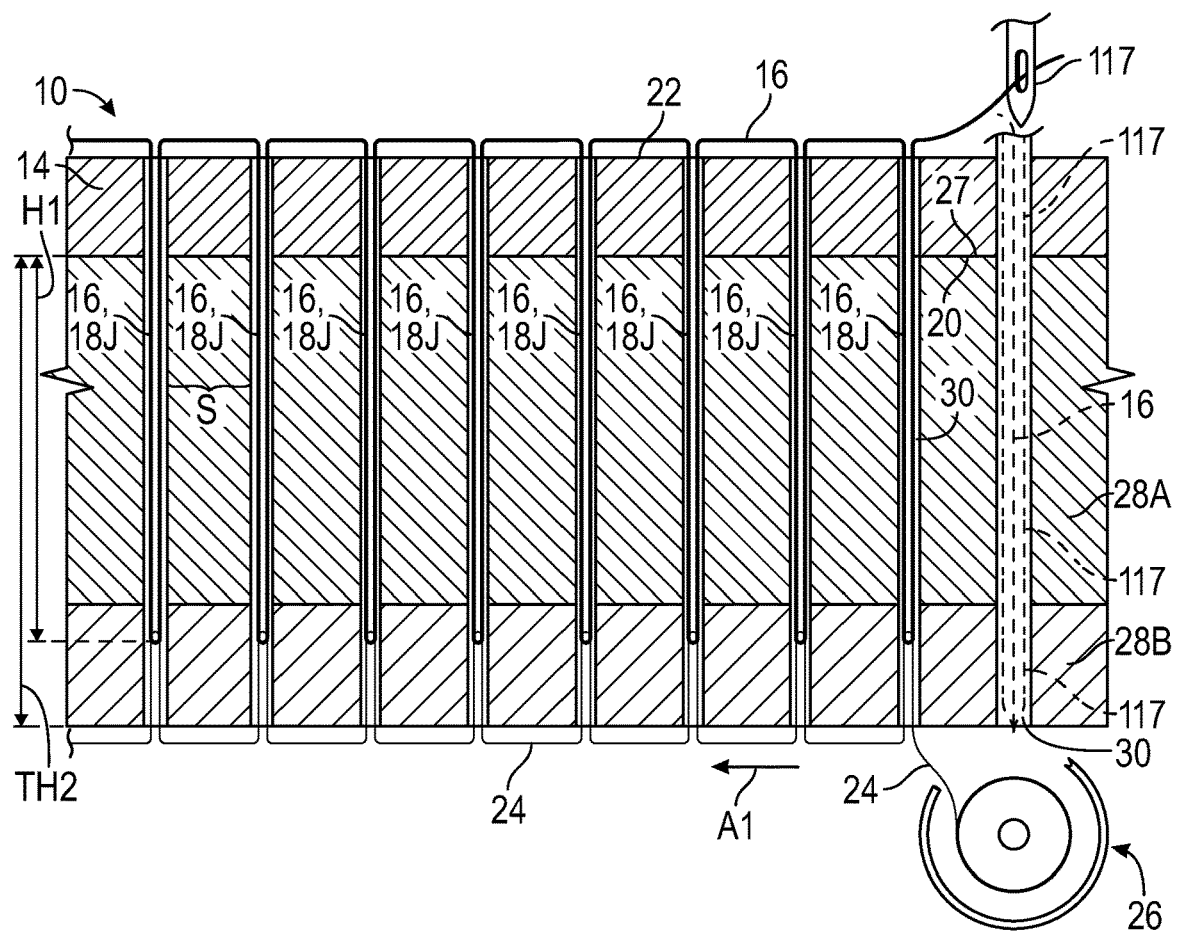
FIG. 17 is a fragmentary cross-sectional view of the article of FIG. 1 at an intermediate stage of manufacture, illustrating manufacturing of the article according to the method disclosed herein by driving a needle thread through the base sheet and multiple stacked spacer layers and engaging a bobbin thread.
Figure 18:
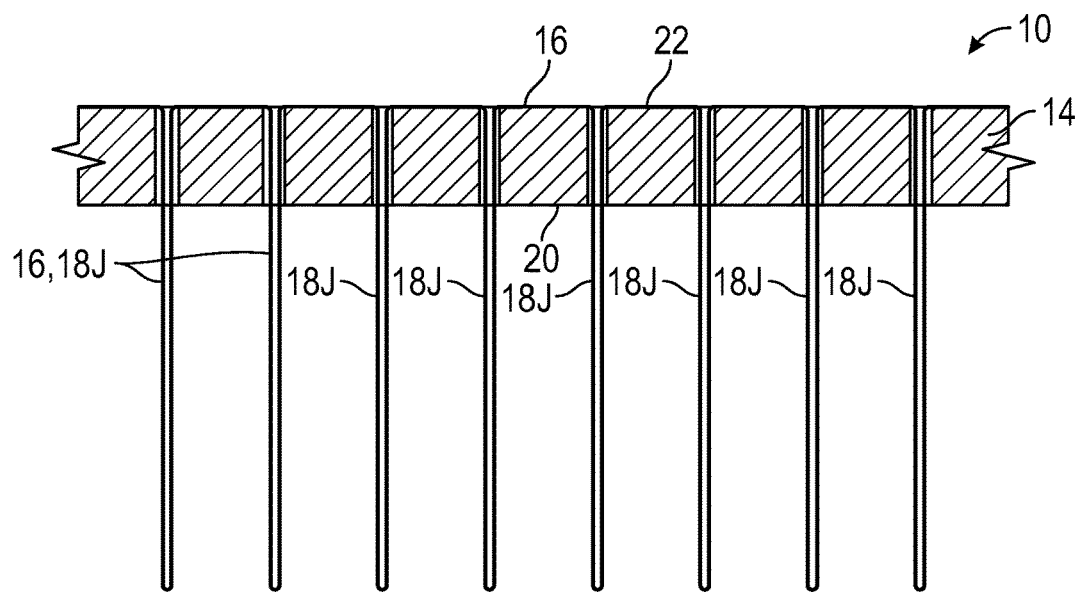
FIG. 18 is a fragmentary cross-sectional view of the article of FIG. 1 after manufacturing according to the method disclosed herein using the multiple stacked layers of FIG. 17.

In other embodiments, multiple spacer layers are used in step 204. For example, FIGS. 17-18 show an option of using two spacer layers 28A, 28B to provide an article 10 with loops 18J of a different height H1 that is larger than height H. Spacer layers 28A, 28B, are stacked together, and the needle 117 drives through the entire stacked layers 28A, 28B. The needle 117 creates bores 30 through each adjacent stacked spacer layer 28A, 28B. Spacer layer 28B is shown having a smaller height than spacer layer 28A, but in other embodiments of the method 200 using multiple stacked spacer layers, each spacer layer could have the same height. In other embodiments, more than two spacer layers may be stacked. In some embodiments, the spacer layer(s) 28, 28A, 28B, etc. may compress during manufacturing of any of the articles described herein. In a non-limiting example, the one or more spacer layers 28 may have a total combined height from about 1 mm to about 12 mm and the loops 18 or any of 18A, 18B, 18C, 18D, 18E, 18F, 18G, 18F, or 18J provided using the one or more spacer layers (e.g., single spacer layer 28 or stacked spacer layers such as spacer layers 28A, 28B) may have a height anywhere within that range, but not limited to such.

Figure 6:
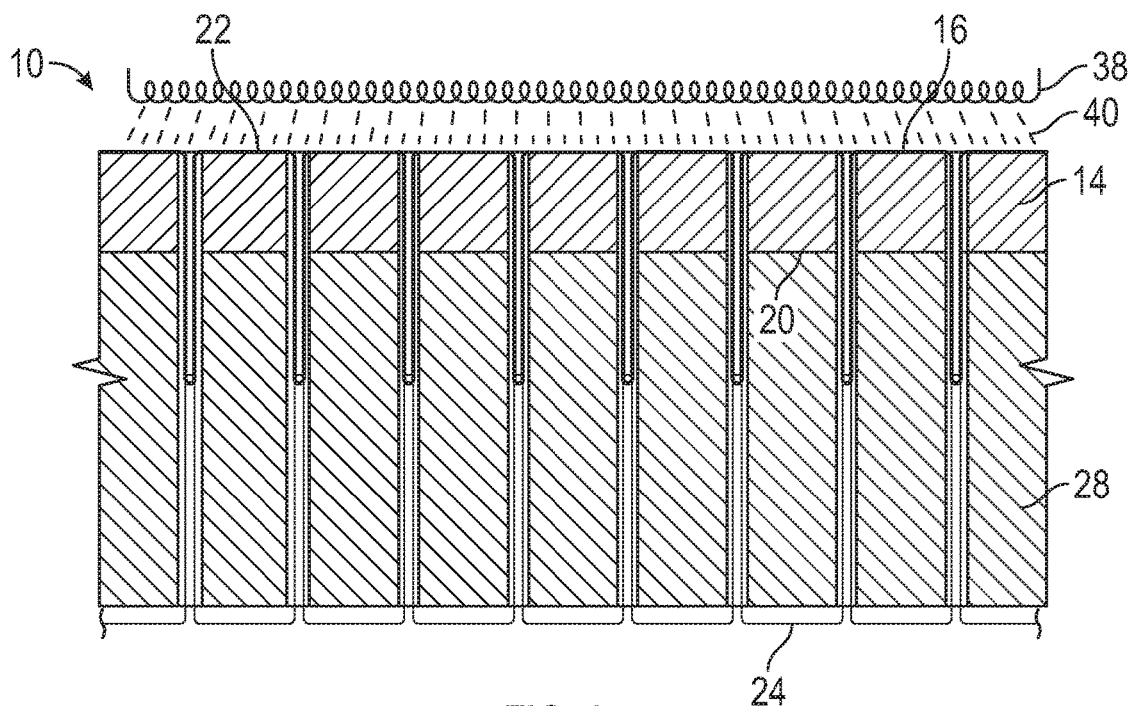
FIG. 6 is a fragmentary cross-sectional view of the article of FIG. 1 at an intermediate stage of manufacture, illustrating melting the needle thread against the base sheet.

When a meltable needle thread 16 is used as in FIGS. 5 and 6, the method 200 proceeds from step 204 to step 208, driving the needle thread 16 through the base sheet 14 via the needle 117 of the embroidery machine 12 according to a programmed first pattern P1 that provide a series of loops 18 of the needle thread 16 extending outward from the bobbin side 20 of the base sheet 14 as depicted in FIG. 5. In FIG. 5, the needle 117 has completed providing the series of loops 18 in the section of the base sheet 14 shown with the embroidery machine 12 moving the article 10 transversely in the direction of arrow A1 relative to the needle 117 between drive cycles of the reciprocating needle 117. A depiction of the needle 117 in phantom shows how it will be driven through the base sheet 14 and the one or more spacer layer(s) 28 to provide the next loop 18. The bobbin 26 rotates so that the soluble bobbin thread 24 engages the needle thread 16 at each loop 18 outward of the bobbin side 20 of the base sheet 14 (e.g., outward of the bobbin side 20 within the spacer layer 28) so that the series of loops 18 extend through the base sheet 14 from the needle side 22 (e.g., the inner side) of the base sheet 14 to the bobbin side 20 (e.g., the outer side) of the base sheet 14 and into the one or more spacer layer(s) 28.

In some embodiments, instead of a meltable needle thread 16, a bonding layer 32, such as a meltable adhesive bonding layer, is disposed at the needle side 22 of the base sheet 14, as shown with respect to article 10B in FIG. 8, to be subsequently melted to bond the needle thread 16 to the needle side 22. Article 10B is otherwise identical to article 10. Accordingly, in such embodiments, the method 200 may include step 206 (prior to step 208), disposing a bonding layer 32 at the needle side 22 of the base sheet 14.

Following step 208, the remainder of the method 200 may occur after the article 10 or the article 10A, 10B, 110, 110A, 310, or 410 is removed from the embroidery machine 12. The method 200 proceeds to step 210, bonding the needle thread 16 to the needle side 22 of the base sheet 14 opposite from the bobbin side 20 of the base sheet 14. In FIG. 6, in order to anchor the needle thread 16 at the needle side 22 of the base sheet 14 opposite from the series of loops 18, a fusible thread may be used for the needle thread 16. In such embodiments, bonding the needle thread 16 in step 210 is indicated by 210A in FIG. 4, and is by applying heat to the fusible needle thread 16 at the needle side 22 of the base sheet 14 as indicated in FIG. 6 with the heating performed by a radiant heating element 38 or convective heating nozzles (not shown) that apply thermal energy 40 at the needle side 22.

Figure 7:
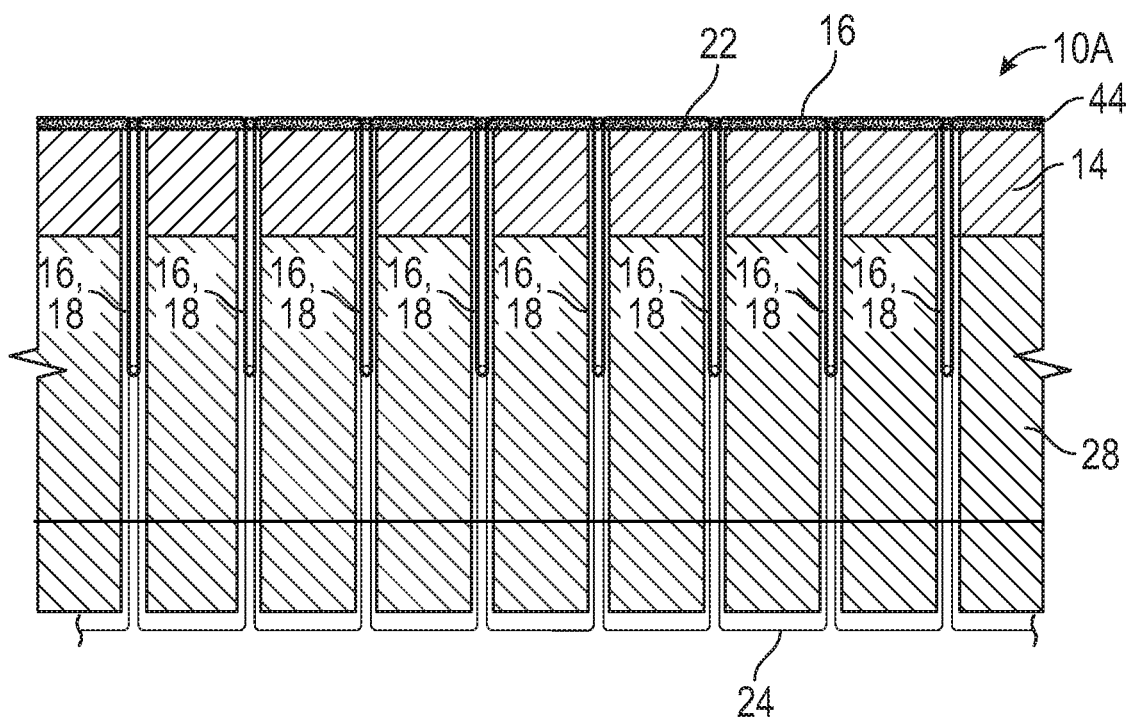
FIG. 7 is a fragmentary cross-sectional view of the article of FIG. 1 at an intermediate stage of manufacture, illustrating adhering the needle thread to the base sheet.

In still other implementations, as shown with respect to article 10A of FIG. 7, a layer of adhesive 44 may be used to anchor the series of loops 18 to the needle side 22 of the base sheet 14 instead of using fusible thread for the thread 16 and instead of using a bonding layer 32. Accordingly, bonding the needle thread 16 to the needle side 22 of the base sheet 14 in step 210 is indicated by 210B in FIG. 4, and includes applying adhesive 44 to the needle side 22 of the base sheet 14. The adhesive 44 coats the needle thread 16 at the needle side 22 and holds it in place at the needle side 22 when the adhesive 44 cures.

Figure 8:
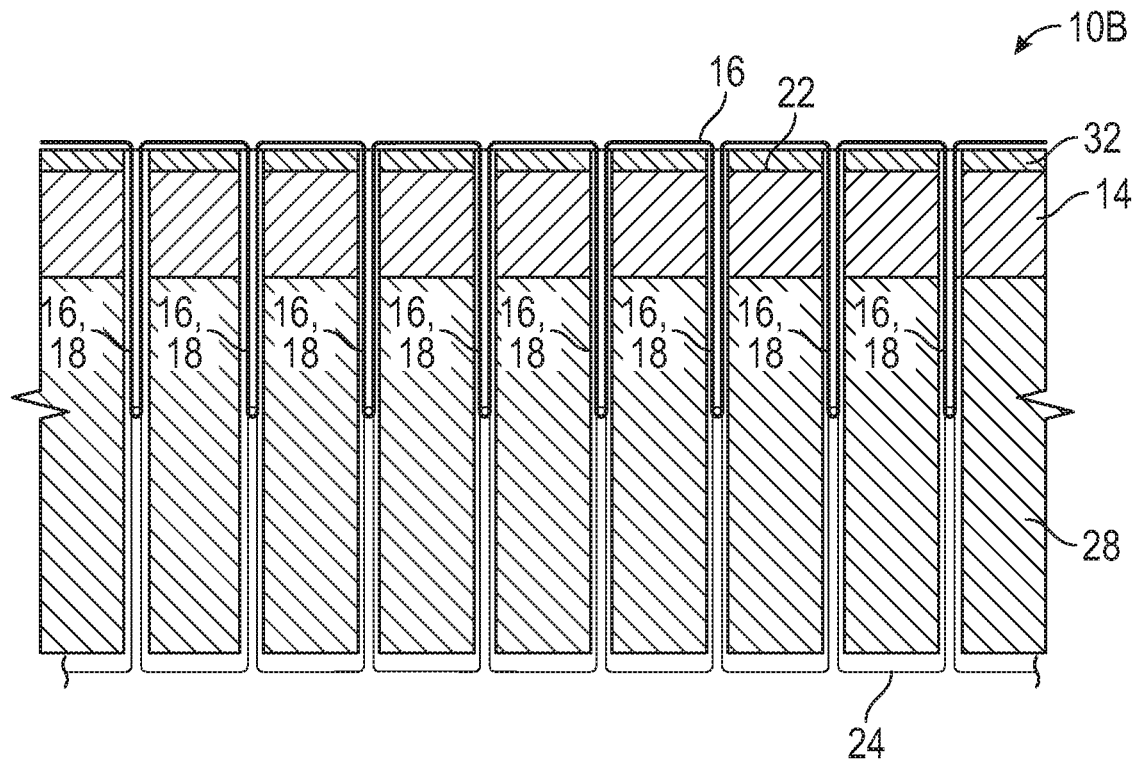
FIG. 8 is a fragmentary cross-sectional view of the article of FIG. 1 at an intermediate stage of manufacture, illustrating adding a meltable bonding layer disposed against the base sheet.
Figure 9:
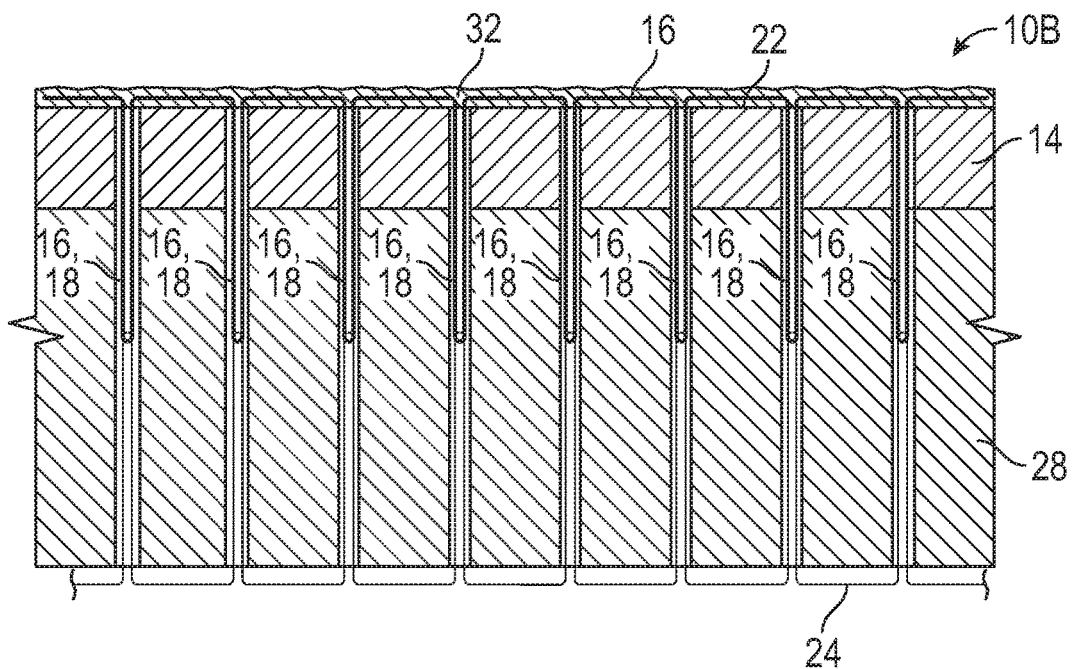
FIG. 9 is a fragmentary cross-sectional view of the article of FIG. 1 at an intermediate stage of manufacture, illustrating the meltable bonding layer melted to the base sheet to secure the needle thread to the base sheet.

In the embodiment of FIG. 8 discussed with respect to step 206, bonding the needle thread 16 to the needle side 22 of the base sheet 14 in step 210 is indicated by 210C in FIG. 4, and includes applying heat to the meltable bonding layer 32 so that it melts, coating the needle thread 16 at the needle side 22 and holding it in place at the needle side 22 when the melted bonding layer 32 cures. In some configurations, the meltable bonding layer 32 may comprise thermoplastic polyurethane.

Figure 10:
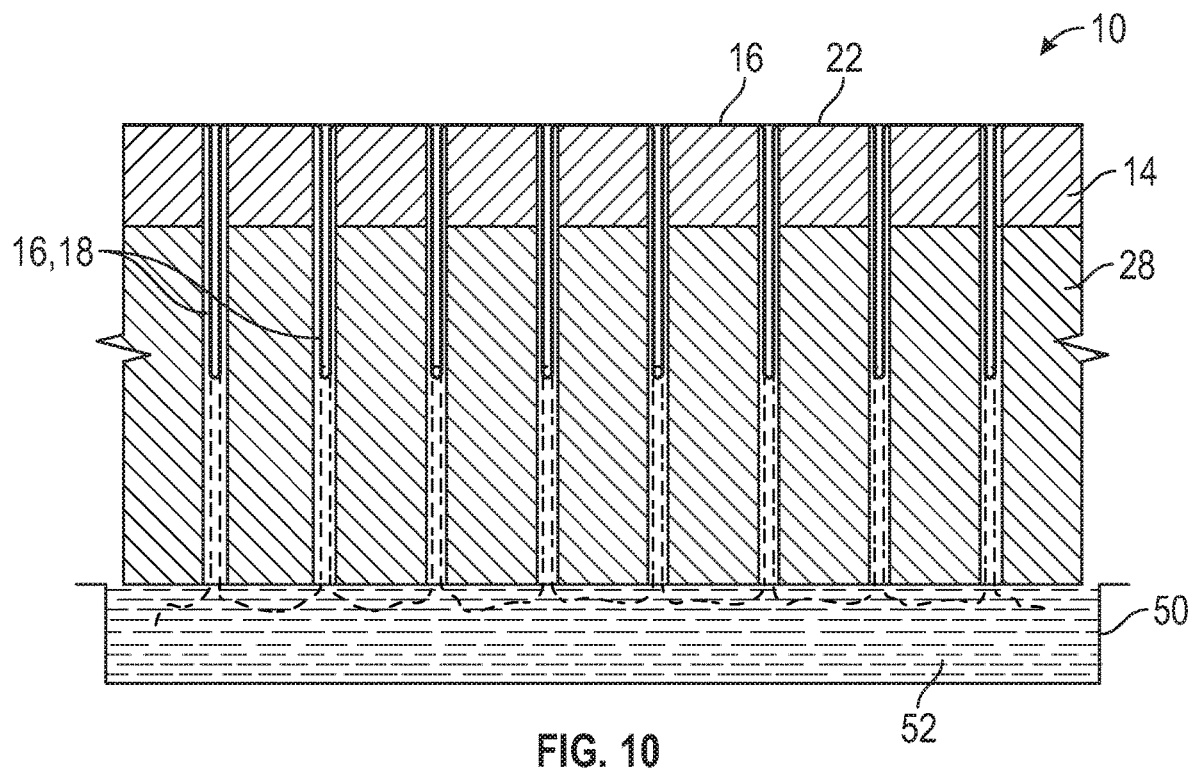
FIG. 10 is a fragmentary cross-sectional view of the article of FIG. 1 at an intermediate stage of manufacture, illustrating dissolving the bobbin thread.

Following step 210, the method 200 proceeds to step 212, removing the bobbin thread 24. In each of the embodiments of articles 10, 10A, 10B shown, the bobbin thread 24 is a water soluble thread, and the solvent is water. FIG. 10 depicts removing the bobbin thread 24 by placing it in a container 50 of water 52 to dissolve the bobbin thread 24, shown in phantom in FIG. 10 with respect to article 10 to represent dissolution of the bobbin thread 24.

Figure 11:
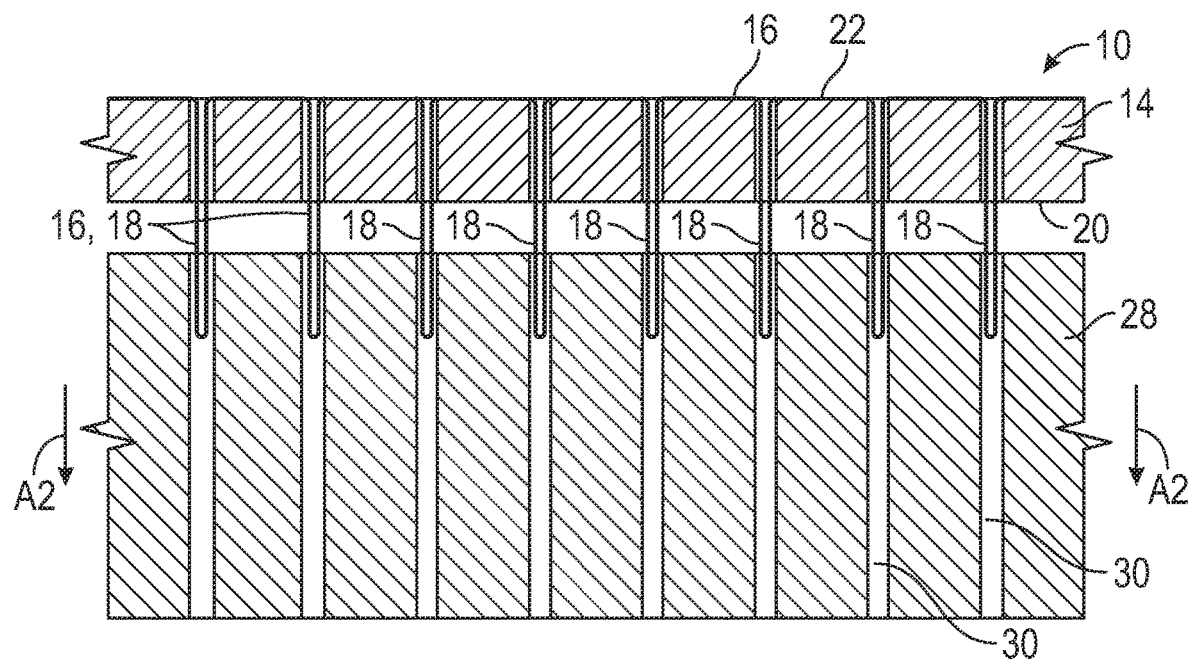
FIG. 11 is a fragmentary cross-sectional view of the article of FIG. 1 at an intermediate stage of manufacture, illustrating removing the spacer layer.

After removing the bobbin thread 24 in step 212, the method 200 proceeds to step 214 in which the one or more spacer layer(s) 28 are moved away from the base sheet 14 such as by pulling the one or more spacer layer(s) 28 away from the bobbin side 20 as indicated by arrows A2 in FIG. 11 to slide the one or more spacer layer(s) 28 off of the series of loops 18. In some implementations, the article 10 may be inverted relative to the position shown in FIG. 11 prior to moving the one or more spacer layer(s) 28 away from the base sheet 14. Alternatively, the one or more spacer layer(s) 28 may be soluble, and may be removed by applying a solvent to the one or more spacer layer(s) 28 to dissolve the one or more spacer layer(s) 28.

Once the one or more spacer layer(s) 28 are moved in step 214, the series of loops 18 will be evident, extending outward from the bobbin side 20 of the base sheet 14. Because the needle thread 16 has been bonded to the needle side 22 in step 210, the series of loops 18 are securely fixed in position relative to the base sheet 14 and relative to one another.

Figure 12:
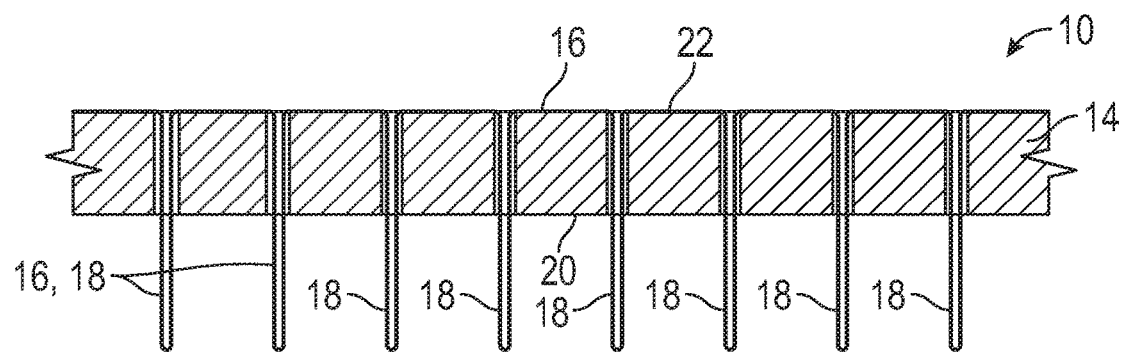
FIG. 12 is a fragmentary cross-sectional view of the article of FIG. 1 after manufacturing according to the method disclosed herein.

As discussed with respect to FIGS. 17 and 18, the method 200 allows for the manufacture of different height loops by stacking spacer layers of a different number of total height at the bobbin side of the base sheet 14. For example, the base sheet 14 shown in FIG. 12 may be referred to as a first base sheet, the spacer layer 28 of FIG. 11 may be referred to as first spacer layer, and the series of loops 18 of FIG. 12 may be referred to as a first series of loops. The method 200 may further comprise disposing one or more second spacer layers (e.g., spacer layers 28A, 28B) that are a second number of spacer layers (e.g., two spacer layers) and have a second total height TH2 at a bobbin side of a second base sheet (base sheet 14 in FIG. 17 is a second base sheet that may be identical to the first base sheet 14 of FIG. 12) so that an inner side of the one or more second spacer layers (e.g., inner side of spacer layer 28A) is at the bobbin side of the second base sheet. The second number of spacer layers 28A, 28B is different than the first number of spacer layers (single spacer layer 28) and the second total height TH2 is different than the first total height TH1. In other embodiments, the second number of spacer layers may be the same as the first number (e.g., a single spacer layer), but with a different height. The needle thread 16 is driven through both the second base sheet 14 and the second spacer layers 28A, 28B with the needle 117 of the embroidery machine according to the programmed first pattern or accordingly to a different programmed pattern that provides a second series of loops 18J of the needle thread 16 that extend outward from the bobbin side of the second base sheet 14 through the one or more second spacer layers 28A, 28B and engage with the bobbin thread 24 disposed at an outer side of the one or more second spacer layers 28A, 28B. The needle thread 16 is then bonded to the needle side 22 of the second base sheet 14, the bobbin thread 24 is removed, and the second spacer layers 28A, 28B are moved away from the base sheet 14 to slide the one or more spacer layers 28A, 28B off of the second series of loops 18J. The second series of loops 18J having a different height H1 than the height H of the first series of loops 18 of FIG. 12. The greater total height TH2 of the stacked spacer layers 28A, 28B enables the taller second series of loops 18J.

Figure 13:
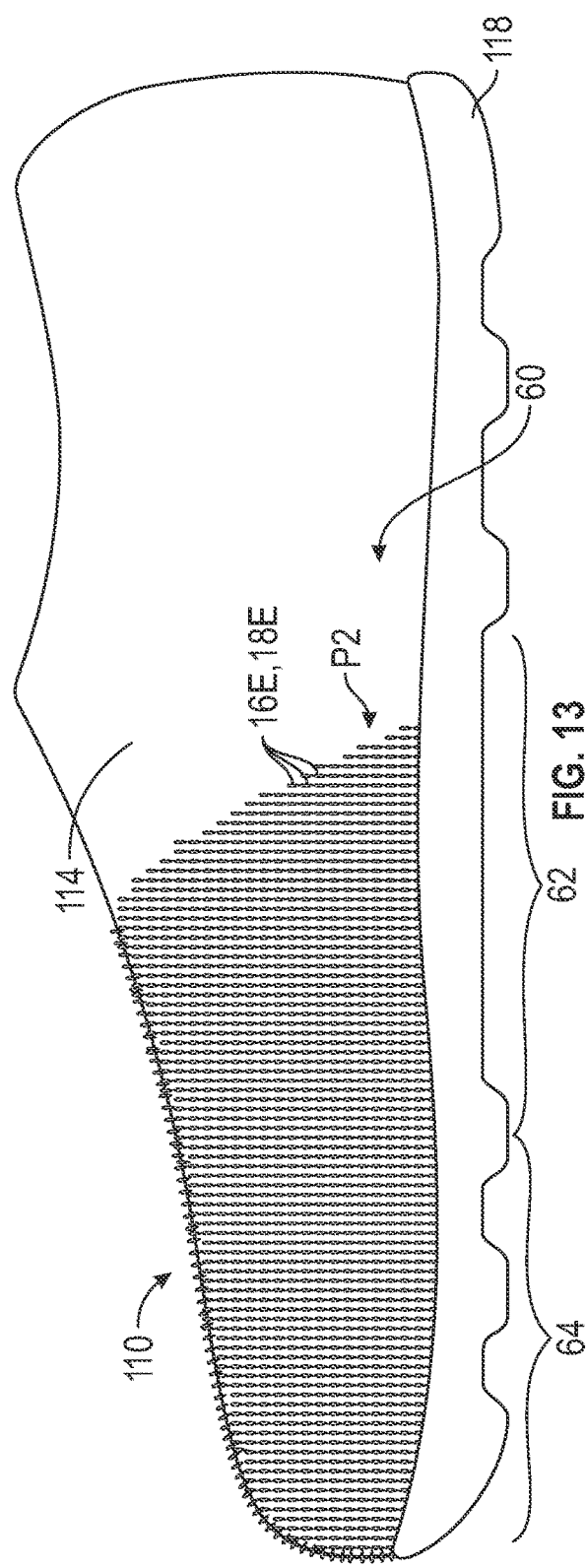
FIG. 13 is a medial side view of an article of footwear with an upper having a series of loops configured as ball control features and manufactured according to the method disclosed herein.

Because of the versatility of the embroidery machine 12 and the ability to store different patterns of movements of the needle drives 116 as stored programs 109 in the controller 108, articles with patterns of loops 18 of different heights, colors, and/or densities, etc. other than those of the first pattern P1 shown on article 10 in FIG. 1 may be manufactured according to the method 200. Accordingly, the method 200 may include step 216, driving a second needle thread 16 through a second base sheet 114 with the needle(s) 117 of the embroidery machine 12 to provide a second series of loops 18E in a second pattern P2 that is different than the first pattern P1 in at least one of color, density of loops, and/or height of loops to provide a second article 110. As shown in FIG. 13, the second base sheet 114 may be an upper 114 of an article of footwear 110. The upper 114 is secured to a sole structure 118. Step 216 includes repeating steps 202, 204, 206 (if a bonding layer 32 is used), 210, 212, and 214 with respect to the second base sheet 114.

In FIG. 13, the thread 16E forms a series of loops 18E that extends outward from an exterior side (e.g., the bobbin side 20 is the exterior side) of the footwear upper 114 at a medial side 60 in a midfoot region 62 and a forefoot region 64 and the loops 18E are configured as ball control elements. The material of the loops 18E adds texture to the exterior side, enabling better grip of a ball when a ball contacts the footwear 110 at the loops 18E.

Figure 14:
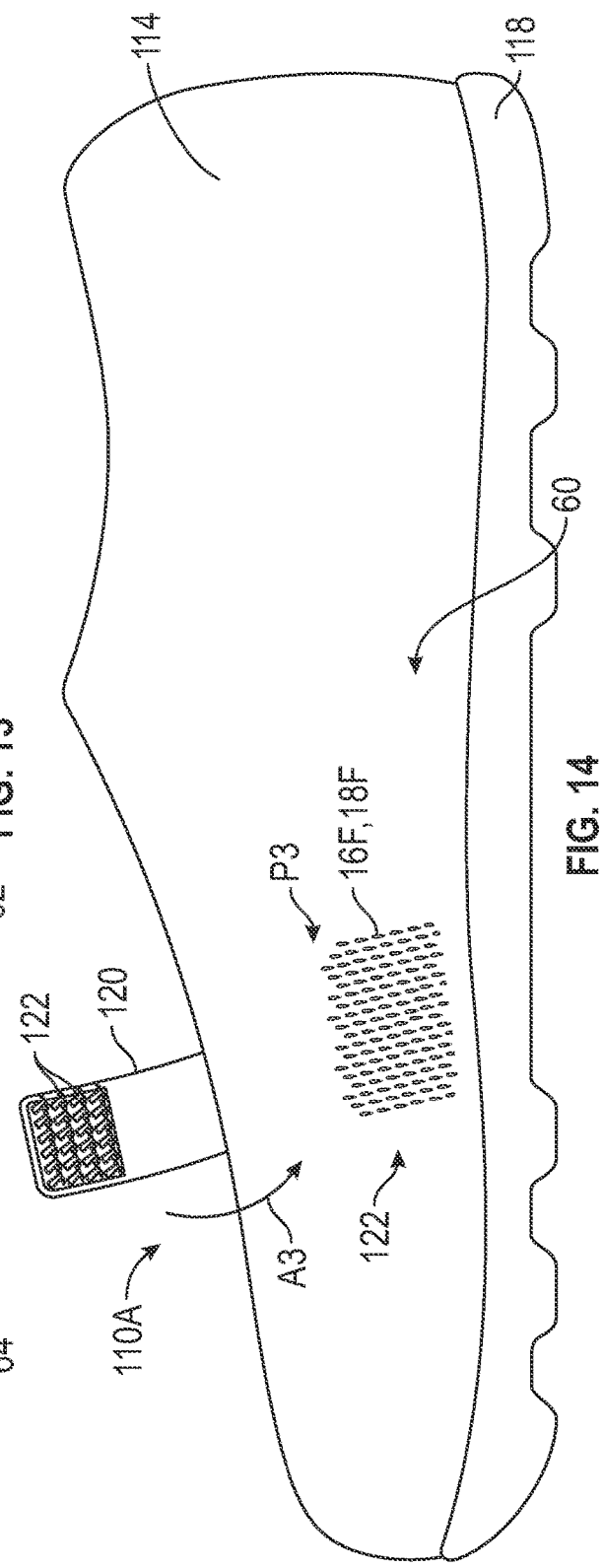
FIG. 14 is a medial side view of an article of footwear with an upper having a series of loops configured as loop portions of a hook-and-loop fastener and manufactured according to the method disclosed herein.

FIG. 14 shows another embodiment of an article of footwear 110A manufactured according to the method 200 and alike in all aspects to the footwear 110 except that the embroidery machine 12 is controlled to drive the thread 16F to provide a series of loops 18F in a third pattern P3. The thread 16F and the series of loops 18F are configured to function as fastener loops of a hook-and-loop fastener. The footwear 110A includes a strap 120 from which as series of hooks 122 extend. The hooks 122 are configured to be releasably engageable with the loops 18F. Together, the loops 18F and hooks 122 function as a hook-and-loop fastener. The strap 120 is shown extended upward for purposes of illustration to show the hooks 122, and can be pulled in the direction of arrow A3 and placed across the upper 114 to extend to the medial side 60 with the hooks 122 pressed onto the loops 18F, engaging the loops 18F to secure the strap 120 against the upper 114 tightening the upper 114 against a foot (not shown) on which the footwear 110A is worn. In still another embodiment, the strap 120 may be processed as described with respect to the base sheet 14 under the method 200 so that the loops 18F extend from the strap 120 without an intervening base layer.

Figure 15:
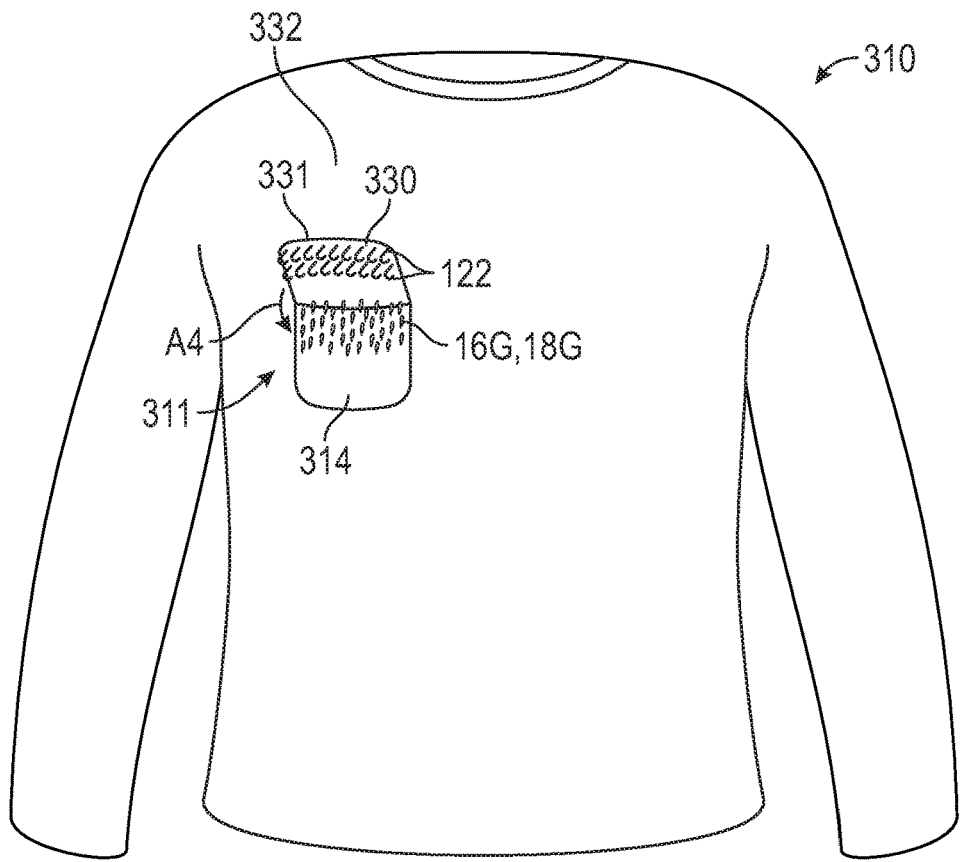
FIG. 15 is a front view of a shirt with a pocket having a series of loops configured as loop portions of a hook-and-loop fastener and manufactured according to the method disclosed herein.

FIG. 15 shows another article 310 which is an article of apparel. More specifically, the article of apparel 310 is a shirt, and may be referred to as shirt 310. The shirt 310 has a pocket 311 that includes a base sheet 314 from which a thread 16G is configured as a series of loops 18G according to the method 200 to extend outward at an exterior side of the base sheet 314. Stated differently, the material of the base sheet of the pocket 311 serves as the base of the loops 18G with no intervening base layer. The base sheet 314 is processed as described with respect to the base sheet 14 under the method 200. The shirt 310 also includes a flap 330 secured to a body 332 of the shirt 310. The flap 330 has a free end 331 that is movable relative to the body 332. A series of hooks 122 extend from the flap 330. The hooks 122 are configured to releasably engage the loops 18G when the flap 330 is pivoted in the direction of arrow A4 and the hooks 122 are pressed against the loops 18G. In still another embodiment, the flap 330 may be processed as described with respect to the base sheet 14 under the method 200 so that the loops 18G extend from the flap 330 without an intervening base layer, and the base sheet 314 includes a series of hooks 122.

Figure 16:
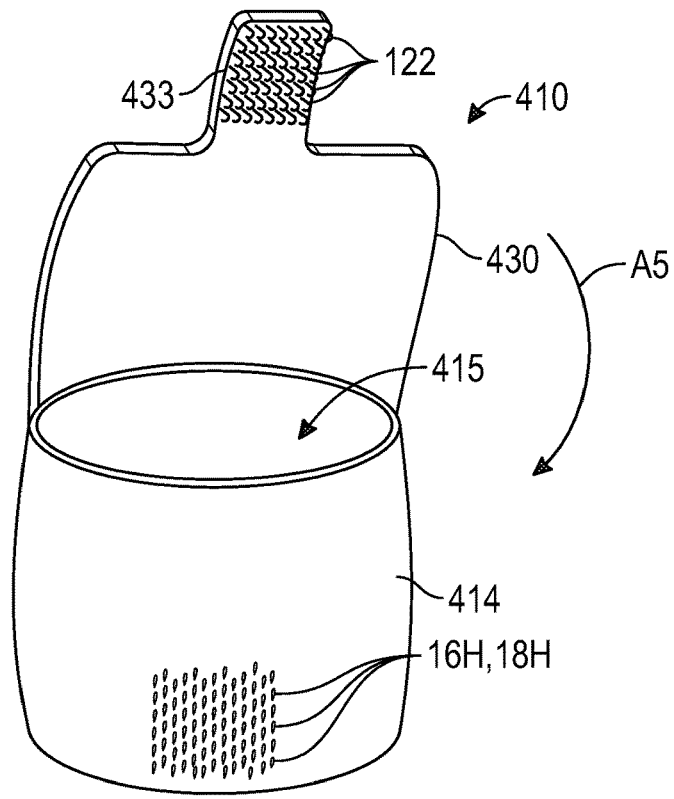
FIG. 16 is a perspective view of a carry bag having a series of loops configured as loop portions of a hook-and-loop fastener and manufactured according to the method disclosed herein.

FIG. 16 shows another article 410 which is a carry bag, such as a backpack, purse, or lunch bag. The carry bag 410 includes a base sheet 414 from which a thread 16H is configured as a series of loops 18H according to the method 200 to extend outward at an exterior side of the base sheet 414. The base sheet 414 at least partially forms a cavity 415 in which items may be placed and carried in the carry bag 410. The base sheet 414 is processed a described with respect to the base sheet 14 under the method 200. The carry bag 410 includes a flap 430 secured to the base sheet 414 of the carry bag 410. The flap 430 is movable relative to the base sheet 414 from an open position to a closed position to secure the flap 430 to the base sheet 414 across the cavity 415. The flap 430 includes a strap portion 433. A series of hooks 122 extend from the strap portion 433. The hooks 122 are configured to releasably engage the loops 18H when the flap 430 is pivoted in the direction of arrow A5 and the hooks 122 are pressed against the loops 18H. In still another embodiment, the strap portion 433 may be processed as described with respect to the base sheet 14 under the method 200 so that the loops 18H extend from the strap portion 433 without an intervening base layer, and the base sheet 414 includes a series of hooks 122.

Accordingly, the articles and methods provided herein utilize an embroidery machine to provide functional and/or decorative loops in an efficient manner with a wide variety of colors/patterns/densities, etc. and without adding an extra layer to the article as the base sheet of the article itself is able to support and retain the loops.

The following Clauses provide example configurations of an article and a method of manufacturing an article disclosed herein.

Clause 1. A method of manufacturing an article, the method comprising: loading a soluble bobbin thread into an embroidery machine; driving a needle thread through a base sheet with a needle of the embroidery machine according to a programmed first pattern that provides a series of loops of the needle thread extending outward from a bobbin side of the base sheet with the soluble bobbin thread engaging the series of loops outward of the bobbin side of the base sheet; bonding the needle thread to a needle side of the base sheet opposite from the bobbin side of the base sheet; and applying a solvent to the soluble bobbin thread to dissolve the soluble bobbin thread.

Clause 2. The method of manufacturing of clause 1, further comprising: prior to driving the needle thread through the base sheet, disposing one or more spacer layers at the bobbin side of the base sheet so that an inner side of the one or more spacers layer is at the bobbin side of the base sheet; driving the needle thread through both the base sheet and the one or more spacer layers so that the series of loops extend through the base sheet from the inner side of the base sheet to an outer side of the base sheet and into the one or more spacer layers and the soluble bobbin thread is outward of an outer side of the one or more spacer layers; and after applying a solvent to the soluble bobbin thread, moving the one or more spacer layers away from the base sheet to slide the one or more spacer layers off of the series of loops.

Clause 3. The method of manufacturing of any of clauses 1-2, wherein the needle thread is a fusible thread, and wherein bonding the needle thread to the needle side of the base sheet includes applying heat to the needle thread at the needle side of the base sheet.

Clause 4. The method of manufacturing of any of clauses 1-2, further comprising: prior to driving the needle thread through the base sheet, disposing a meltable bonding layer against the needle side of the base sheet; wherein driving the needle thread through the base sheet further comprises driving the needle thread through the meltable bonding layer; and wherein bonding the needle thread to the needle side of the base sheet includes applying heat to the meltable bonding layer.

Clause 5. The method of manufacturing of clause 4, wherein the meltable bonding layer comprises thermoplastic polyurethane.

Clause 6. The method of manufacturing of any of clauses 1-2, further comprising: applying adhesive to the needle side of the base sheet.

Clause 7. The method of manufacturing of any of clauses 1-6, wherein the series of loops is configured as a loop portion of a hook-and-loop fastener.

Clause 8. The method of manufacturing of any of clauses 1-6, wherein the series of loops extends outward from a footwear upper and at least some of the loops are configured as ball control elements.

Clause 9. The method of manufacturing of any of clauses 1-8, wherein the soluble bobbin thread is water soluble and the solvent is water.

Clause 10. The method of manufacturing of any of clauses 1-9, wherein a first group of the loops has a first density and a second group of the loops has a second density different from the first density.

Clause 11. The method of manufacturing of any of clauses 1-10, wherein a first set of the loops has a first color and a second set of the loops has a second color different from the first color.

Clause 12. The method of manufacturing of clause 11, wherein a third set of the loops is disposed between the first set and the second set and has a color gradient that changes from the first color to the second color.

Clause 13. The method of manufacturing of any of clauses 1-12, wherein the article is a first article, the base sheet is a first base sheet, the needle thread is a first needle thread, and the method further comprising: driving a second needle thread through a second base sheet with the needle of the embroidery machine in a second pattern different than the first pattern in at least one of color, density of the loops, or height of the loops.

Clause 14. A method of manufacturing an article, the method comprising: disposing one or more spacer layers at an inner side of a base sheet so that an inner side of the one or more spacer layers is at the bobbin side of a base sheet; driving a needle thread through both the base sheet and the one or more spacer layers with a needle of an embroidery machine according to a programmed first pattern that provide a series of loops of the needle thread extending outward from the bobbin side of the base sheet through the one or more spacer layers and engage with a bobbin thread disposed on an outer side of the one or more spacer layers; bonding the needle thread to a needle side of the base sheet opposite from the bobbin side of the base sheet; removing the bobbin thread; and moving the one or more spacer layers away from the base sheet to slide the one or more spacer layers off of the series of loops.

Clause 15. The method of clause 14, wherein the bobbin thread is a soluble bobbin thread, and wherein removing the bobbin thread is by applying a solvent to the soluble bobbin thread to dissolve the soluble bobbin thread.

Clause 16. The method of manufacturing of clause 15, wherein the soluble bobbin thread is water soluble and the solvent is water.

Clause 17. The method of manufacturing of clause 14, wherein the needle thread is a fusible thread, and wherein bonding the needle thread to the needle side of the base sheet includes applying heat to the needle thread.

Clause 18. The method of manufacturing of clause 14, further comprising: prior to driving the needle thread through the base sheet, disposing a meltable bonding layer against the needle side of the base sheet; wherein driving the needle thread through the base sheet further comprises driving the needle thread through the meltable bonding layer; and wherein bonding the needle thread to the needle side of the base sheet includes applying heat to the meltable bonding layer.

Clause 19. The method of manufacturing of clause 18, wherein the meltable bonding layer comprises thermoplastic polyurethane.

Clause 20. The method of manufacturing of any of clauses 14-16, further comprising: applying adhesive to the needle side of the base sheet.

Clause 21. The method of manufacturing of any of clauses 14-20, wherein the series of loops is configured as a loop portion of a hook-and-loop fastener.

Clause 22. The method of manufacturing of clause 21, wherein the series of loops extends outward from a footwear upper and at least some of the loops are configured as ball control elements.

Clause 23. The method of manufacturing of any of clauses 14-22, wherein a first group of the loops has a first density and a second group of the loops has a second density different from the first density.

Clause 24. The method of manufacturing of any of clauses 14-23, wherein a first set of the loops has a first color and a second set of the loops has a second color different from the first color.

Clause 25. The method of manufacturing of clause 24, wherein a third set of the loops is disposed between the first set and the second set and has a color gradient that changes from the first color to the second color.

Clause 26. The method of manufacturing of any of clauses 14-25, wherein the article is a first article, the base sheet is a first base sheet, the needle thread is a first needle thread, and the method further comprising: driving a second needle thread through a second base sheet with the needle of the embroidery machine in a second pattern different than the first pattern in at least one of color, density of the loops, or height of the loops.

Clause 27. An article comprising: a base sheet; and a thread configured as a series of loops, the series of loops configured as a loop portion of a hook-and-loop fastener and arranged in a first pattern and extending through the base sheet and outward from a first side of the base sheet; wherein the thread is bonded to a second side of the base sheet opposite from the first side of the base sheet; wherein the article is a footwear upper, apparel, or a carry bag.

Clause 28. The article of clause 27, wherein the series of loops is configured as a loop portion of a hook-and-loop fastener.

Clause 29. The article of any of clauses 27-28, wherein the thread is a fusible thread and is directly fused to the second side of the base sheet.

Clause 30. The article of any of clauses 27-28, further comprising: a meltable bonding layer disposed against the second side of the base sheet; wherein the thread extends through the meltable bonding layer; and wherein the thread is bonded to the second side of the base sheet by the meltable bonding layer.

Clause 31. The article of any of clauses 27-30, wherein the article is a footwear upper and the series of loops extends at an exterior of the footwear upper.

Clause 32. The article of clause 31, wherein the series of loops is configured as a ball control feature.

Clause 33. The article of any of clauses 27-30, wherein the article is apparel, and the series of loops is configured as a loop portion of a hook-and-loop fastener.

Clause 34. The article of any of clauses 27-30, wherein the article is a carry bag, and the series of loops is configured as a loop portion of a hook-and-loop fastener.

To assist and clarify the description of various embodiments, various terms are defined herein. Unless otherwise indicated, the following definitions apply throughout this specification (including the claims). Additionally, all references referred to are incorporated herein in their entirety.

An "article of footwear", a "footwear article of manufacture", and "footwear" may be considered to be both a machine and a manufacture. Assembled, ready to wear footwear articles (e.g., shoes, sandals, boots, etc.), as well as discrete components of footwear articles (such as a midsole, an outsole, an upper component, etc.) prior to final assembly into ready to wear footwear articles, are considered and alternatively referred to herein in either the singular or plural as "article(s) of footwear".

"A", "an", "the", "at least one", and "one or more" are used interchangeably to indicate that at least one of the items is present. A plurality of such items may be present unless the context clearly indicates otherwise. All numerical values of parameters (e.g., of quantities or conditions) in this specification, unless otherwise indicated expressly or clearly in view of the context, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing all values and further divided ranges within the range.

The terms "comprising", "including", and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items. The term "any of" is understood to include any possible combination of referenced items, including "any one of" the referenced items. The term "any of" is understood to include any possible combination of referenced claims of the appended claims, including "any one of" the referenced claims.

For consistency and convenience, directional adjectives may be employed throughout this detailed description corresponding to the illustrated embodiments. Those having ordinary skill in the art will recognize that terms such as "above", "below", "upward", "downward", "top", "bottom", etc., may be used descriptively relative to the figures, without representing limitations on the scope of the invention, as defined by the claims.

The term "longitudinal" refers to a direction extending a length of a component. For example, a longitudinal direction of a shoe extends between a forefoot region and a heel region of the shoe. The term "forward" or "anterior" is used to refer to the general direction from a heel region toward a forefoot region, and the term "rearward" or "posterior" is used to refer to the opposite direction, i.e., the direction from the forefoot region toward the heel region. In some cases, a component may be identified with a longitudinal axis as well as a forward and rearward longitudinal direction along that axis. The longitudinal direction or axis may also be referred to as an anterior-posterior direction or axis.

The term "transverse" refers to a direction extending a width of a component. For example, a transverse direction of a shoe extends between a lateral side and a medial side of the shoe. The transverse direction or axis may also be referred to as a lateral direction or axis or a mediolateral direction or axis.

The term "vertical" refers to a direction generally perpendicular to both the lateral and longitudinal directions. For example, in cases where a sole is planted flat on a ground surface, the vertical direction may extend from the ground surface upward. It will be understood that each of these directional adjectives may be applied to individual components of a sole. The term "upward" or "upwards" refers to the vertical direction pointing towards a top of the component, which may include an instep, a fastening region and/or a throat of an upper. The term "downward" or "downwards" refers to the vertical direction pointing opposite the upwards direction, toward the bottom of a component and may generally point towards the bottom of a sole structure of an article of footwear.

The "interior" of an article of footwear, such as a shoe, refers to portions at the space that is occupied by a wearer's foot when the shoe is worn. The "inner side" of a component refers to the side or surface of the component that is (or will be) oriented toward the interior of the component or article of footwear in an assembled article of footwear. The "outer side" or "exterior" of a component refers to the side or surface of the component that is (or will be) oriented away from the interior of the shoe in an assembled shoe. In some cases, other components may be between the inner side of a component and the interior in the assembled article of footwear. Similarly, other components may be between an outer side of a component and the space external to the assembled article of footwear. Further, the terms "inward" and "inwardly" refer to the direction toward the interior of the component or article of footwear, such as a shoe, and the terms "outward" and "outwardly" refer to the direction toward the exterior of the component or article of footwear, such as the shoe. In addition, the term "proximal" refers to a direction that is nearer a center of a footwear component, or is closer toward a foot when the foot is inserted in the article of footwear as it is worn by a user. Likewise, the term "distal" refers to a relative position that is further away from a center of the footwear component or is further from a foot when the foot is inserted in the article of footwear as it is worn by a user. Thus, the terms proximal and distal may be understood to provide generally opposing terms to describe relative spatial positions.

While various embodiments have been described, the description is intended to be exemplary, rather than limiting and it will be apparent to those of ordinary skill in the art that many more embodiments and implementations are possible that are within the scope of the embodiments. Any feature of any embodiment may be used in combination with or substituted for any other feature or element in any other embodiment unless specifically restricted. Accordingly, the embodiments are not to be restricted except in light of the attached claims and their equivalents. Also, various modifications and changes may be made within the scope of the attached claims.

While several modes for carrying out the many aspects of the present teachings have been described in detail, those familiar with the art to which these teachings relate will recognize various alternative aspects for practicing the present teachings that are within the scope of the appended claims. It is intended that all matter contained in the above description or shown in the accompanying drawings shall be interpreted as illustrative and exemplary of the entire range of alternative embodiments that an ordinarily skilled artisan would recognize as implied by, structurally and/or functionally equivalent to, or otherwise rendered obvious based upon the included content, and not as limited solely to those explicitly depicted and/or described embodiments.

What is claimed is:

1. A method of manufacturing an article, the method comprising:
    loading a soluble bobbin thread into an embroidery machine;
    driving a needle thread through a base sheet with a needle of the embroidery machine according to a programmed first pattern that provides a series of loops of the needle thread extending outward from a bobbin side of the base sheet with the soluble bobbin thread engaging the series of loops outward of the bobbin side of the base sheet;
    bonding the needle thread to a needle side of the base sheet opposite from the bobbin side of the base sheet; and
    applying a solvent to the soluble bobbin thread to dissolve the soluble bobbin thread;
    wherein the needle thread is a fusible thread, and wherein bonding the needle thread to the needle side of the base sheet includes applying heat to the needle thread at the needle side of the base sheet.

2. The method of manufacturing of claim 1, wherein the series of loops is configured as a loop portion of a hook-and-loop fastener.

3. The method of manufacturing of claim 1, further comprising:
prior to driving the needle thread through the base sheet, disposing one or more spacer layers at the bobbin side of the base sheet so that an inner side of the one or more spacer layers is at the bobbin side of the base sheet;
driving the needle thread through both the base sheet and the one or more spacer layers so that the series of loops extends through the base sheet from the needle side of the base sheet to the bobbin side of the base sheet and into the one or more spacer layers, and the soluble bobbin thread is outward of an outer side of the one or more spacer layers; and
after applying the solvent to the soluble bobbin thread, moving the one or more spacer layers away from the base sheet to slide the one or more spacer layers off of the series of loops.

4. The method of manufacturing of claim 3, wherein the base sheet is a first base sheet, and the one or more spacer layers are one or more first spacer layers that are a first number of spacer layers and have a first total height, the series of loops is a first series of loops, and the method further comprising:
disposing one or more second spacer layers that are a second number of spacer layers and have a second total height at a bobbin side of a second base sheet so that an inner side of the one or more second spacer layers is at the bobbin side of the second base sheet; wherein the second number of spacer layers is different than the first number of spacer layers, the second total height is different than the first total height, or both;
driving a second needle thread through both the second base sheet and the one or more second spacer layers with the needle of the embroidery machine according to the programmed first pattern or a different programmed pattern that provides a second series of loops of the second needle thread that extends outward from the bobbin side of the second base sheet through the one or more second spacer layers and engages with a second bobbin thread disposed at an outer side of the one or more second spacer layers;
bonding the second needle thread to a needle side of the second base sheet opposite from the bobbin side of the second base sheet;
removing the second bobbin thread; and
moving the one or more second spacer layers away from the second base sheet to slide the one or more second spacer layers off of the second series of loops, the second series of loops having a different height than the first series of loops.

5. The method of manufacturing of claim 1, further comprising:
applying adhesive to the needle side of the base sheet.

6. The method of manufacturing of claim 1, wherein the series of loops extends outward from a footwear upper and at least some of the loops are configured as ball control elements or as a strap fastener.

7. The method of manufacturing of claim 1, wherein the soluble bobbin thread is water soluble and the solvent is water.

8. The method of manufacturing of claim 1, wherein:
a first group of the loops has a first density and a second group of the loops has a second density different from the first density; and/or
a first set of the loops has a first color and a second set of the loops has a second color different from the first color.

9. The method of manufacturing of claim 1, wherein the article is a first article, the base sheet is a first base sheet, the needle thread is a first needle thread, and the method further comprising:
driving a second needle thread through a second base sheet with the needle of the embroidery machine to form a second series of loops in a second pattern different than the first pattern in at least one of color, density of the second series of loops, or height of the second series of loops.

10. A method of manufacturing an article, the method comprising:
disposing one or more first spacer layers at a bobbin side of a first base sheet so that an inner side of the one or more first spacer layers is at the bobbin side of the first base sheet;
wherein the one or more first spacer layers are a first number of spacer layers and have a first total height;
driving a first needle thread through both the first base sheet and the one or more first spacer layers with a needle of an embroidery machine according to a programmed first pattern that provides a first series of loops of the first needle thread that extends outward from the bobbin side of the first base sheet through the one or more first spacer layers and engages with a first bobbin thread disposed at an outer side of the one or more first spacer layers;
bonding the first needle thread to a needle side of the first base sheet opposite from the bobbin side of the first base sheet;
removing the first bobbin thread;
moving the one or more first spacer layers away from the first base sheet to slide the one or more first spacer layers off of the first series of loops;
disposing one or more second spacer layers that are a second number of spacer layers and have a second total height at a bobbin side of a second base sheet so that an inner side of the one or more second spacer layers is at the bobbin side of the second base sheet wherein the second number of spacer layers is different than the first number of spacer layers, the second total height is different than the first total height, or both;
driving a second needle thread through both the second base sheet and the one or more second spacer layers with the needle of the embroidery machine according to the programmed first pattern or a different programmed pattern that provides a second series of loops of the second needle thread that extends outward from the bobbin side of the second base sheet through the one or more second spacer layers and engages with a second bobbin thread disposed at an outer side of the one or more second spacer layers;
bonding the second needle thread to a needle side of the second base sheet opposite from the bobbin side of the second base sheet;
removing the second bobbin thread; and
moving the one or more second spacer layers away from the second base sheet to slide the one or more second spacer layers off of the second series of loops, the second series of loops having a different height than the first series of loops.

11. The method of manufacturing of claim 10, wherein the first series of loops is configured as a loop portion of a hook-and-loop fastener.

12. The method of manufacturing of claim 10, wherein the first series of loops extends outward from a footwear upper and at least some of the loops of the first series of loops are configured as ball control elements or as a strap fastener.

13. The method of manufacturing of claim 10, wherein first bobbin thread is a soluble bobbin thread, and wherein removing the first bobbin thread is by applying a solvent to the soluble bobbin thread to dissolve the soluble bobbin thread.

14. A method of manufacturing an article, the method comprising:
  loading a soluble bobbin thread into an embroidery machine;
  disposing one or more first spacer layers at a bobbin side of a first base sheet so that an inner side of the one or more first spacer layers is at the bobbin side of the first base sheet;
wherein there are a first number of first spacer layers that have a first total height;
  driving a first needle thread through both the first base sheet and the one or more first spacer layers with a needle of the embroidery machine according to a programmed first pattern that provides a first series of loops of the first needle thread extending through the first base sheet from a needle side of the first base sheet to the bobbin side of the first base sheet and into the one or first more spacer layers, and the soluble bobbin thread engaging the first series of loops outward of an outer side of the one or more first spacer layers;
  bonding the first needle thread to the needle side of the first base sheet opposite from the bobbin side of the first base sheet;
  applying a solvent to the soluble bobbin thread to dissolve the soluble bobbin thread;
  after applying the solvent to the soluble bobbin thread, moving the one or more first spacer layers away from the first base sheet to slide the one or more first spacer layers off of the first series of loops;
  disposing one or more second spacer layers that are a second number of spacer layers and have a second total height at a bobbin side of a second base sheet so that an inner side of the one or more second spacer layers is at the bobbin side of the second base sheet; wherein the second number of spacer layers is different than the first number of spacer layers, the second total height is different than the first total height, or both;
  driving a second needle thread through both the second base sheet and the one or more second spacer layers with the needle of the embroidery machine according to the programmed first pattern or a different programmed pattern that provides a second series of loops of the second needle thread that extends outward from the bobbin side of the second base sheet through the one or more second spacer layers and engages with a second bobbin thread disposed at an outer side of the one or more second spacer layers;
  bonding the second needle thread to a needle side of the second base sheet opposite from the bobbin side of the second base sheet;
  removing the second bobbin thread; and
  moving the one or more second spacer layers away from the second base sheet to slide the one or more second spacer layers off of the second series of loops, the second series of loops having a different height than the first series of loops.

15. A method of manufacturing an article, the method comprising:
  loading a soluble bobbin thread into an embroidery machine;
  driving a needle thread through a base sheet with a needle of the embroidery machine according to a programmed first pattern that provides a series of loops of the needle thread extending outward from a bobbin side of the base sheet with the soluble bobbin thread engaging the series of loops outward of the bobbin side of the base sheet;
  bonding the needle thread to a needle side of the base sheet opposite from the bobbin side of the base sheet;
  applying a solvent to the soluble bobbin thread to dissolve the soluble bobbin thread; and
  prior to driving the needle thread through the base sheet, disposing a meltable bonding layer against the needle side of the base sheet;
  wherein driving the needle thread through the base sheet further comprises driving the needle thread through the meltable bonding layer; and
  wherein bonding the needle thread to the needle side of the base sheet includes applying heat to the meltable bonding layer.

* * * * *